US012667078B2

(12) United States Patent
Pan et al.

(10) Patent No.: US 12,667,078 B2
(45) Date of Patent: Jun. 30, 2026

(54) AUTOMATIC CAT EXCREMENT REMOVING DEVICE

(71) Applicant: FOSHAN LEILONG ELECTRIC APPLIANCE CO., LTD, Foshan (CN)

(72) Inventors: Shuwei Pan, Foshan (CN); Yuanbin Wen, Foshan (CN); Yuan Yao, Foshan (CN)

(73) Assignee: FOSHAN LEILONG ELECTRIC APPLIANCE CO., LTD, Foshan (CN)

( * ) Notice: Subject to any disclaimer, the term of this patent is extended or adjusted under 35 U.S.C. 154(b) by 0 days.

(21) Appl. No.: 19/278,806

(22) Filed: Jul. 24, 2025

(65) Prior Publication Data

US 2025/0344665 A1     Nov. 13, 2025

Related U.S. Application Data

(63) Continuation of application No. 18/029,926, filed as application No. PCT/CN2022/096445 on May 31, 2022.

(30) Foreign Application Priority Data

Jun. 1, 2021     (CN) .......................... 202110605442.9

(51) Int. Cl.
*A01K 1/01*               (2006.01)
(52) U.S. Cl.
CPC .................................. *A01K 1/0114* (2013.01)
(58) Field of Classification Search
CPC ..... A01K 1/0107; A01K 1/011; A01K 1/0114
USPC ......................................................... 119/165
See application file for complete search history.

(56) References Cited

U.S. PATENT DOCUMENTS

| | | | | |
|---|---|---|---|---|
| 5,507,252 A | * | 4/1996 | Ebert | A01K 1/0114 119/166 |
| 5,509,379 A | * | 4/1996 | Hoeschen | A01K 1/0114 209/288 |
| 5,662,066 A | * | 9/1997 | Reitz | A01K 1/0114 119/163 |

(Continued)

FOREIGN PATENT DOCUMENTS

| | | | | |
|---|---|---|---|---|
| CN | 109220826 A | * | 1/2019 | B08B 3/102 |
| CN | 112452731 A | * | 3/2021 | A01K 1/0114 |
| DE | 202011101182 U1 | * | 9/2011 | A01K 1/0114 |

*Primary Examiner* — Kimberly S Berona
*Assistant Examiner* — Erica Michelle Huebner
(74) *Attorney, Agent, or Firm* — Soleado Law, PC

(57)                ABSTRACT

An automatic cat excrement removing device includes a pedestal, a ball compartment assembly that is detachably mounted on the pedestal. The ball compartment assembly has an axis and is configured to rotate around the axis relative to the pedestal. A peripheral contour of the ball compartment assembly is a shape of a revolving body. The peripheral contour of the ball compartment assembly is formed by a working compartment, a screening compartment, and an excrement collection compartment that is provided with an opening that is configured to allow cat excrement to fall into the excrement collection compartment. An excrement collection compartment cover plate assembly is disposed at the opening of the excrement collection compartment. The excrement collection compartment cover plate assembly is configured to selectively open or close the opening.

17 Claims, 14 Drawing Sheets

(56)                    References Cited

U.S. PATENT DOCUMENTS 5,911,194  A  *   6/1999  Pierson, Jr.  ..........  A01K 1/0114
                                                                119/166
5,931,119  A  *   8/1999  Nissim  .................  A01K 1/0114
                                                                119/166
9,433,185  B2 *   9/2016  Baxter  .................  A01K 1/0114

* cited by examiner

AUTOMATIC CAT EXCREMENT REMOVING DEVICE

CROSS-REFERENCE TO RELATED APPLICATIONS

This application is a continuation of U.S. patent application Ser. No. 18/029,926, filed on Apr. 3, 2023, which claims priority to Chinese Patent Application No. 202110605442.9, filed to the China National Intellectual Property Administration on Jun. 1, 2021, entitled "Automatic Cat Excrement Removing Device," the entire contents of which are incorporated herein by reference.

TECHNICAL FIELD

The present disclosure relates to the field of pet products, and specifically, to an automatic cat excrement removing device.

BACKGROUND

With the continuous improvement of material life and the simplification of family members nowadays, more and more families, especially young singles, like to keep pets as daily companions and playmates in their leisure time, especially in economically developed metropolitan areas, where more and more people tend to keep cats due to housing area. Generally, trained cats excrete excrement on cat litter and bury the excrement, and then people need to manually pick up the excrement from the cat litter, which is time-consuming and laborious. In addition, in the daytime, people need to go out to work and are unable to clean up the cat excrement in time, resulting in the accumulation of cat excrement, which not only makes the room stink due to the unpleasant smell, but also brings a series of hygiene problems. Therefore, it is very important to invent an automatic cat excrement removing device. In existing automatic cat excrement removing devices, a drum-type cat excrement removing device based on a gravity screening principle is favored by consumers due to the advantages of a simple structure and stable performance, so that the drum-type cat excrement removing device occupies the main market.

In the art known to inventors, in the drum-type cat excrement removing device, an excrement collection compartment is disposed outside a drum, and does not rotate with the drum when the drum rotates. For this problem, some technologies are to dispose the excrement collection compartment in the space of a pedestal, and such a design increases the thickness of the pedestal, so that a certain space needs to be reserved for the pedestal, resulting in an increase in the height of the pedestal, thereby further increasing the height and difficulty when a cat enters the drum, and in particular, it is inconvenient for some stumpy cats when the cats enter and exit the drum. In addition, since the position of the drum is relatively high, the cat jumps when leaving the drum, the cat litter in the drum is brought out to pollute the ground, so that some manufactures will add a cat litter collection apparatus at a position where the cat enters and exits, so as to collect the cat litter brought out, or add a slop at the position where the cat enters and exits, so as to allow the cat to enter and exit conveniently, but this will increase manufacturing costs, and the occupied area of the cat excrement removing device is increased. In addition, the excrement collection compartment is disposed at the bottom, and the user needs to squat down when cleaning the excrement collection compartment, so that it is inconvenient for the users who are taller and heavier.

Some technologies are to dispose the excrement collection compartment on the rear side of the drum. In this way, the front-rear length of the entire cat excrement removing device is greatly increased, and the occupied area of the cat excrement removing device is increased, so that the cat excrement removing device is not suitable for the user having a small room, the space utilization of the cat excrement removing device is low. In addition, the user needs to move or adjust, when cleaning the excrement collection compartment each time, the position of the cat excrement removing device, so as to taken out the excrement collection compartment located on the rear side of the drum, so that the cat excrement removing device is low in convenience and laborious.

A special channel needs to be added to the cat excrement removing device in the art known to inventors, and is configured to output the cat excrement in the drum into the excrement collection compartment. The conveying process requires a high requirement of accuracy in the alignment of a structure and increases the complexity of the structure. If the structure is not aligned, the cat excrement will pollute the entire output channel, so that the workload of the user for cleaning is increased. In addition, the cat excrement in the excrement collection compartment is easily accumulated at the channel port, so that a sensing signal that the capacity of the excrement collection compartment is full is triggered in advance. If there is a high accumulation of the cat excrement in the excrement collection compartment, it is possibly to bring the cat excrement in a gap between the drum and the pedestal when the drum rotates, so that the difficulty and workload of the user for cleaning are further increased. In another aspect, the special channel is disposed between the drum and the excrement collection compartment, and relatively moves when the drum rotates, causing a shearing action, so that the cat excrement removing device has the possibility of cat-clamping accidents. In order to avoid the possibility of such cat-clamping accidents, some manufacturers determine whether the cat is in the drum by disposing a plurality of safety determination sensors, and dispose an emergency stop sensor. However, these measures not only increase production costs, but also increase the complexity of a procedure, and if the procedure is more complex, it is more likely to make mistakes. For example, when it is detected that there is a risk of clamping a cat, the device starts emergency stop, but whether the cat escapes cannot be determined; if resetting is performed at the moment, the damage to the cat is aggravated; and if resetting is not performed, the device cannot be used. Such determination may also systematically mis-triggered, and the device is in an inoperable state after mis-triggering; and if the user goes out to work or is on a business trip, the cat cannot use the device for a long time.

SUMMARY

In order to at least partially solve the above or other potential problems, some embodiments of the present disclosure provide an automatic cat excrement removing device, which realizes automatic separation of cat litter and cat excrement and also achieves sealed storage of the cat excrement. In addition, the automatic cat excrement removing device has a simple and compact structure, has a small size and is portable, has high space utilization, and is easy to clean.

The present disclosure provides an automatic cat excrement removing device. The automatic cat excrement removing device includes: a ball compartment assembly, configured to have at least three spaces including a working compartment used for holding cat litter and allowing a cat to excrete, a screening compartment for screening cat litter and cat excrement, and an excrement collection compartment for holding cat excrement, wherein a surface of the screening compartment facing a center of a circle of the ball compartment assembly is provided with a plurality of screening holes; and a driving assembly, configured to drive the ball compartment assembly to automatically rotate. When the ball compartment assembly rotates to an initial position, the working compartment is located at a lowest position of the ball compartment assembly; when the ball compartment assembly rotates to a first position from the initial position, the screening compartment is located at the lowest position of the ball compartment assembly, so that the cat litter falls into the screening compartment through the plurality of screening holes, while the cat excrement stays in the working compartment because a size of the cat excrement is larger than a size each of the plurality of screening holes; and when the ball compartment assembly rotates to a second position, the excrement collection compartment is located at the lowest position of the ball compartment assembly, so that the cat excrement falls into the excrement collection compartment.

According to the embodiments of the present disclosure, by means of dividing the ball compartment assembly into at least three spaces, that is, integrating the working compartment, the screening compartment and the excrement collection compartment on the ball compartment assembly, the cat excrement is screened, collected and stored in the ball compartment assembly, so that the entire automatic cat excrement removing device has a simple and compact structure, has a small device size, is portable, and has high space utilization. In addition, the cat excrement is stored in the ball compartment assembly all the time, so that other accessories are not polluted, the workload of a user for cleaning is reduced, and the user can clean the device conveniently.

In some embodiments, a peripheral contour of the ball compartment assembly is a shape of a revolving body, the peripheral contour of the ball compartment assembly is formed by the working compartment, the screening compartment and the excrement collection compartment together, and has a peripheral contour in a shape of a revolving body. In this way, by means of designing the ball compartment assembly to be in a spherical shape, the space utilization of the ball compartment assembly reaches a highest state; and the space of the working compartment is maximized, so that a cat conveniently enters the working compartment to excrete.

In some embodiments, the working compartment is axially provided with an inlet, which is configured to allow the cat to enter and exit the working compartment; and the excrement collection compartment is provided with an opening, which is configured to allow the cat excrement to fall into the excrement collection compartment.

In this way, since the working compartment, the screening compartment and the excrement collection compartment are integrated on the ball compartment assembly, the ball compartment assembly is nearly attached to the ground, and the height of the inlet of the working compartment does not exceed 10 cm, facilitating the entering and exiting of older or fatter cats. In addition, since the height of the inlet is relatively low, the cat does not need to jump during entering and exiting, so that the problem of the cat litter being brought out in large quantities in the art known to inventors is solved fundamentally. The inlet for the cat to enter the working compartment always maintains a relatively-stationary state with the opening of the excrement collection compartment, and the excrement collection compartment always moves with the ball compartment assembly, and since the inlet for the cat is set in the axial direction and the inlet is distributed in the rotation center of the ball compartment assembly, the inlet will not overlap with other stationary parts when the ball compartment assembly is rotating, so the entire automatic cat excrement removing device has no other holes or channels where misalignment occurs, and a mechanical shearing action does not exist. In this way, cat-clamping accidents do not occur even if a sensing apparatus fails and the ball compartment assembly starts to rotate when the cat is in the ball compartment assembly, so that the entire device is safe and reliable, the possibility that the cat is clamped is eliminated from the root, and problems such as greatly increased costs or complex procedures prone to errors caused by the addition of various safety measures are avoided. In addition, the cat excrement directly falls into the excrement collection compartment by means of the opening of the excrement collection compartment without disposing a special channel, so that convenient cleaning is achieved, there is no cleaning dead corners, so that there is no problem in the art known to inventors that the cat excrement cannot smoothly enters the excrement collection compartment caused by incomplete alignment and overlapping of the channel port due to rotation errors does not occur, or there is no problem that, when the cat excrement is fully accumulated or sticked near the channel port, the cat excrement is squeezed and smeared everywhere by the relatively-misaligned and relatively-rotating channel port and cannot be cleaned.

In some embodiments, the working compartment is disposed opposite to the screening compartment; and the excrement collection compartment is located on a side of the screening compartment, and is configured to cause the working compartment to be located near the highest position of the ball compartment assembly when the screening compartment and the excrement collection compartment or the screening compartment or the excrement collection compartment is located at the lowest position of the ball compartment assembly.

In this way, by means of disposing the working compartment opposite to the screening compartment and disposing the excrement collection compartment on one side of the screening compartment, when the ball compartment assembly is driven by the driving assembly to rotate until the screening compartment is located at the lowest position of the ball compartment assembly, the cat litter falls into the screening compartment through the screening holes, and the cat excrement completely stays outside the screening compartment. Then when the ball compartment assembly rotates until the excrement collection compartment is located at the lowest position, the cat excrement falls into the excrement collection compartment. When the ball compartment assembly then rotates until the working compartment is located at the lowest position of the ball compartment assembly, the cat litter falls back into the working compartment from the screening compartment, and then the ball compartment assembly stops rotating and waits for the next operation. By means of specializing the relative position of the working compartment, the screening compartment and the excrement collection compartment, a series of actions of screening, collection and storage of cat excrement and returning of cat litter may be smoothly performed in order during the rotation of the ball compartment assembly, a desirable screening effect is achieved, an excrement output structure is saved, and requirements for a driving mechanism are lowered, thereby reducing costs. In addition, the device is simple in structure and high in stability. In an initial state, the excrement collection compartment is located at the top of the ball compartment assembly, so that the user may directly clean the excrement collection compartment without squatting down, including replacing a rubbish bag for the excrement collection compartment, removing waste cat litter, and the like. In some embodiments, an end of the excrement collection compartment is hinged to the working compartment, and is configured to turn outwards relative to the working compartment.

In this way, by means of hinging the excrement collection compartment to the working compartment, the rubbish bag may be covered in the excrement collection compartment, so that the user may turn the excrement collection compartment outwards relative to the working compartment, so as to cover or take down the rubbish bag, thereby conveniently removing the stored cat excrement. Then the user may not only pour new cat litter by means of the inlet of the working compartment, but also turn the excrement collection compartment outwards to pour the new cat litter into the working compartment from the corresponding hole. The user may choose to squat or stand to carry out operations, so that there are diversified ways.

In some embodiments, an excrement collection compartment cover plate assembly is disposed at the opening of the excrement collection compartment, and is configured to selectively open or close the opening. The excrement collection compartment cover plate assembly and a mounting mating surface of the opening are configured to clamp an opening portion of a rubbish bag and allow the rubbish bag to maintain in an opening status.

In this way, by means of disposing the excrement collection compartment cover plate assembly, the opening is selectively opened or closed, to cause the excrement collection compartment to be in a closed state when the cat excrement does not need to be collected, so as to prevent the odor of the cat excrement from exuding, thereby keeping the room fresh and hygienically clean. By means of using the excrement collection compartment cover plate assembly and the mounting mating surface of the opening to clamp the opening portion of the rubbish bag, a fixation mode is simple and stable; and the user only needs to take down the excrement collection compartment cover plate assembly to cover the rubbish bag or replace a new rubbish bag, which is convenient and fast. Since during the rotation of the ball compartment assembly, the excrement collection compartment revolves around the center of a circle of the ball compartment assembly, and the cat excrement stored in the excrement collection compartment is inverted and rearranged during rotation, so that the cat excrement is not accumulated near the excrement collection compartment cover plate assembly, and problems that the capacity of the excrement collection compartment cannot be fully utilized or a false alarm of the capacity is called cannot occur, thereby guaranteeing the normal operation of the automatic cat excrement removing device. When the excrement collection compartment is full, the cat excrement in the working compartment cannot enter the excrement collection compartment, then the automatic cat excrement removing device stops the operation of automatically screening the cat excrement without affecting a cat to normally use the automatic cat excrement removing device, so that the cat still may enter the working compartment to excrete.

In some embodiments, the excrement collection compartment cover plate assembly includes: a base, detachably connected to the opening; and a cover plate, of which an end is hinged to the base, and configured to be in an open state under an action of self-gravity when the excrement collection compartment is at the lowest position of the ball compartment assembly, the cat excrement falling into the excrement collection compartment at the moment. When the excrement collection compartment is at the highest position of the ball compartment assembly, the cover plate returns to a closed state under the action of self-gravity, and the cat excrement is locked in the excrement collection compartment at the moment.

In this way, using self-gravity of the cover plate to achieve the opening and closing of the cover plate greatly reduces costs while the opening is selectively opened or closed. In addition, the device is mature in technology and high in stability.

In some embodiments, the excrement collection compartment cover plate assembly further includes: a first magnet, disposed on a free end of the cover plate. A second magnet is disposed at a position of the base which corresponding to the first magnet, and is configured to guarantee the cover plate and the base to be always in a locking state during the rotation of the ball compartment assembly from the initial position to the second position. When the ball compartment assembly returns to the initial position, the cover plate rests on the base again under the action of its own gravity, and at the moment, the first magnet and the second magnet are re-adsorbed to reinforce a locking force between the cover plate and the base.

In this way, during a process that the ball compartment assembly rotates from the initial position to the second position, the cover plate is guaranteed to be always adsorbed on the base, and does not hang freely due to the action of the self-gravity of the cover plate, so as to ensure that the excrement collection compartment is sustainably sealed until the ball compartment assembly rotates to the second position. During a process that the ball compartment assembly reversely rotates from the second position to the initial position, the superposition of the cat excrement and the self-gravity of the cover plate exceeds the magnetic force of the first magnet and the second magnet, so that the cover plate is opened in a pivoted manner, and then the cat excrement falls into the excrement collection compartment. When the ball compartment assembly returns to the initial position, the cover plate rests on the base again under the action of self-gravity, so that the first magnet and the second magnet are adsorbed again, so as to further reinforce the locking force between the cover plate and the base.

In some embodiments, the automatic cat excrement removing device further includes: a sensing apparatus, configured to start, when the cat is sensed to leave the working compartment, the driving assembly to drive the ball compartment assembly to rotate from the initial position to the second position via the first position, until the cat excrement falls into the excrement collection compartment.

In this way, the sensing apparatus is disposed and configured to sense whether the cat has entered the working compartment to excrete, and sense whether the cat has left the working compartment. When sensing that the cat has left the working compartment, the sensing apparatus sends a signal to the driving assembly to start the driving assembly, so as to drive the ball compartment assembly to rotate to the second position from the initial position via the first position; and during the rotation of the ball compartment assembly, the screening compartment and the excrement collection compartment successively pass through the lowest position of the ball compartment assembly, until all cat excrement falls into the excrement collection compartment. Therefore, the automatic cat excrement removing device may be prevented from being accidentally started to operate when the cat excretes, thereby guaranteeing use safety.

In some embodiments, the automatic cat excrement removing device further includes: a litter-cleaning module, configured to start, when a user starts the litter-cleaning module, the driving assembly to drive the ball compartment assembly to reversely rotate from the initial position to the first position via the second position, until the cat litter completely falls into the excrement collection compartment.

In this way, by means of disposing the litter-cleaning module, the user starts the litter-cleaning module, and then the driving assembly receives the signal to drive the ball compartment assembly to reversely rotate to the first position from the initial position via the second position, until the cat litter completely falls into the excrement collection compartment; then the ball compartment assembly stops operating when continuously rotating back to the initial position, waste cat litter may be automatically collected. Therefore, the user only needs to clean the excrement collection compartment or the rubbish bag in the excrement collection compartment after a litter-cleaning action is completed, so that the device is convenient, fast, clean and hygienic.

In some embodiments, the automatic cat excrement removing device further includes a pedestal. The ball compartment assembly is detachably mounted on the pedestal and rotates around its own axis relative to the pedestal. The driving assembly includes: a motor, fixedly disposed on the pedestal; and a gear assembly, of which one end is fixedly disposed on an output end of the motor, and an other end is selectively connected to the ball compartment assembly, and configured to drive the ball compartment assembly to rotate under the driving of the motor.

In this way, since the ball compartment assembly is mounted on the pedestal and may be selectively separated from the pedestal, the user only needs to lift the ball compartment assembly during cleaning, so as to achieve separation from the pedestal, so that the device is convenient for cleaning. By means of the cooperation of the gear assembly and the motor, the ball compartment assembly is driven to rotate by using a mature technology, so that the device is mature in technology, simple in structure and low in cost.

In some embodiments, an end of the pedestal that is away from the gear assembly is further provided with rolling wheels, which are configured to support the ball compartment assembly when the ball compartment assembly is mounted on the pedestal; and when the ball compartment assembly rotates, the rolling wheels simultaneously rotate around their own axis.

In this way, by means of disposing the rolling wheels, frictional resistance during rotation is reduced while a supporting force is provided for the ball compartment assembly, so that the ball compartment assembly may smoothly rotate in a labor-saving manner, so as to reduce the abrasion of a machine, thereby prolonging the service life, and further improving effects of screening, collection and storage of cat excrement and returning of cat litter.

Further features of the present disclosure will become apparent from the following description of exemplary embodiments with reference to the drawings. It is to be understood that, the content described in the present application is not intended to identify the key or important features of the embodiments of the present disclosure, nor is it intended to limit the scope of the present disclosure. Other features of the present disclosure will become easy to understand through the following description.

BRIEF DESCRIPTION OF THE DRAWINGS

The drawings described herein are used to provide a further understanding of this application, and constitute a part of the present disclosure. The exemplary embodiments and descriptions of the present disclosure are used to explain the present disclosure and do not constitute an improper limitation of the present disclosure. In the drawings.

Figure 1:
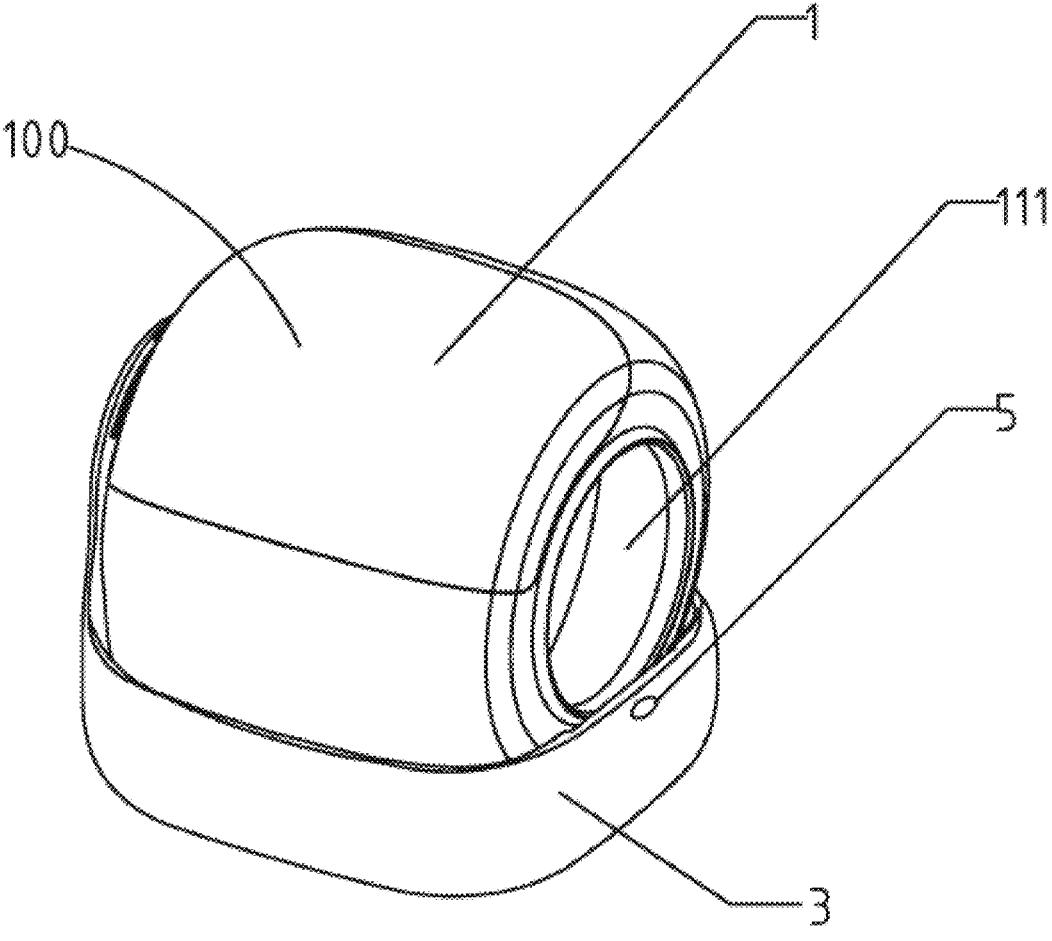
FIG. 1 illustrates a schematic three-dimensional diagram of an automatic cat excrement removing device according to an embodiment of the present disclosure.

Throughout the drawings, the same or similar drawing signs are used to indicate the same or similar components.

DETAILED DESCRIPTION OF THE EMBODIMENTS

It is to be noted that the embodiments in present disclosure and the features in the embodiments may be combined with one another without conflict. The present disclosure will now be described below in detail with reference to the drawings and the embodiments.

In the art known to inventors, in the drum-type cat excrement removing device, an excrement collection compartment is disposed outside a drum, and does not rotate with the drum when the drum rotates. For this problem, some technologies are to dispose the excrement collection compartment in the space of a pedestal, and such a design increases the thickness of the pedestal, so that a certain space needs to be reserved for the pedestal, resulting in an increase in the height of the pedestal, thereby further increasing the height and difficulty when a cat enters the drum, and in particular, it is inconvenient for some stumpy cats when the cats enter and exit the drum. In addition, since the position of the drum is relatively high, the cat jumps when leaving the drum, the cat litter in the drum is brought out to pollute the ground, so that some manufactures will add a cat litter collection apparatus at a position where the cat enters and exits, so as to collect the cat litter brought out, or add a slop at the position where the cat enters and exits, so as to allow the cat to enter and exit conveniently, but this will increase manufacturing costs, and the occupied area of the cat excrement removing device is increased. In addition, the excrement collection compartment is disposed at the bottom, and the user needs to squat down when cleaning the excrement collection compartment, so that it is inconvenient for the users who are taller and heavier.

Some technologies are to dispose the excrement collection compartment on the rear side of the drum. In this way, the front-rear length of the entire cat excrement removing device is greatly increased, and the occupied area of the cat excrement removing device is increased, so that the cat excrement removing device is not suitable for the user having a small room, the space utilization of the cat excrement removing device is low. In addition, the user needs to move or adjust, when cleaning the excrement collection compartment each time, the position of the cat excrement removing device, so as to taken out the excrement collection compartment located on the rear side of the drum, so that the cat excrement removing device is low in convenience and laborious.

A special channel needs to be added to the cat excrement removing device in the art known to inventors, and is configured to output the cat excrement in the drum into the excrement collection compartment. The conveying process requires a high requirement of accuracy in the alignment of a structure and increases the complexity of the structure. If the structure is not aligned, the cat excrement will pollute the entire output channel, so that the workload of the user for cleaning is increased. In addition, the cat excrement in the excrement collection compartment is easily accumulated at the channel port, so that a sensing signal that the capacity of the excrement collection compartment is full is triggered in advance. If there is a high accumulation of the cat excrement in the excrement collection compartment, it is possibly to bring the cat excrement in a gap between the drum and the pedestal when the drum rotates, so that the difficulty and workload of the user for cleaning are further increased. In another aspect, the special channel is disposed between the drum and the excrement collection compartment, and relatively moves when the drum rotates, causing a shearing action, so that the cat excrement removing device has the possibility of cat-clamping accidents. In order to avoid the possibility of such cat-clamping accidents, some manufacturers determine whether the cat is in the drum by disposing a plurality of safety determination sensors, and dispose an emergency stop sensor. However, these measures not only increase production costs, but also increase the complexity of a procedure, and if the procedure is more complex, it is more likely to make mistakes. For example, when it is detected that there is a risk of clamping a cat, the device starts emergency stop, but whether the cat escapes cannot be determined; if resetting is performed at the moment, the damage to the cat is aggravated; and if resetting is not performed, the device cannot be used. Such determination may also be systematically mis-triggered, and the device is in an inoperable state after mis-triggering; and if the user goes out to work or is on a business trip, the cat cannot use the device for a long time.

Some embodiments of the present disclosure provide an automatic cat excrement removing device 100, to solve or at least partially solve the above or other potential problems. Some embodiments are now described with reference to FIG. 1 to FIG. 22.

Figure 2:
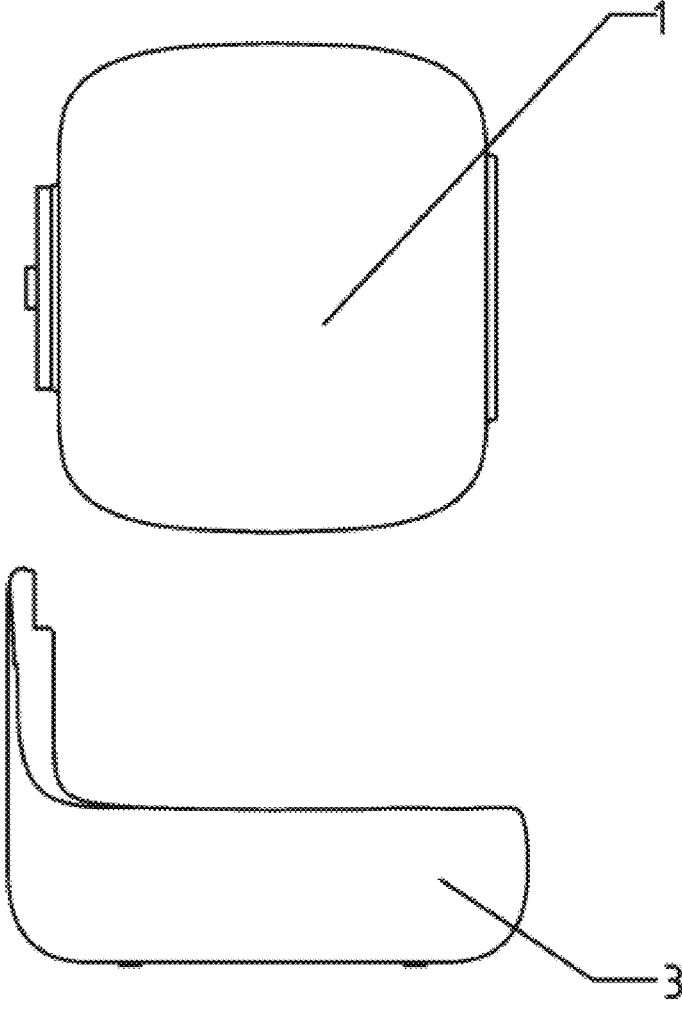
FIG. 2 illustrates a schematic diagram of the automatic cat excrement removing device in FIG. 1 when a ball compartment assembly is taken down.
Figure 3:
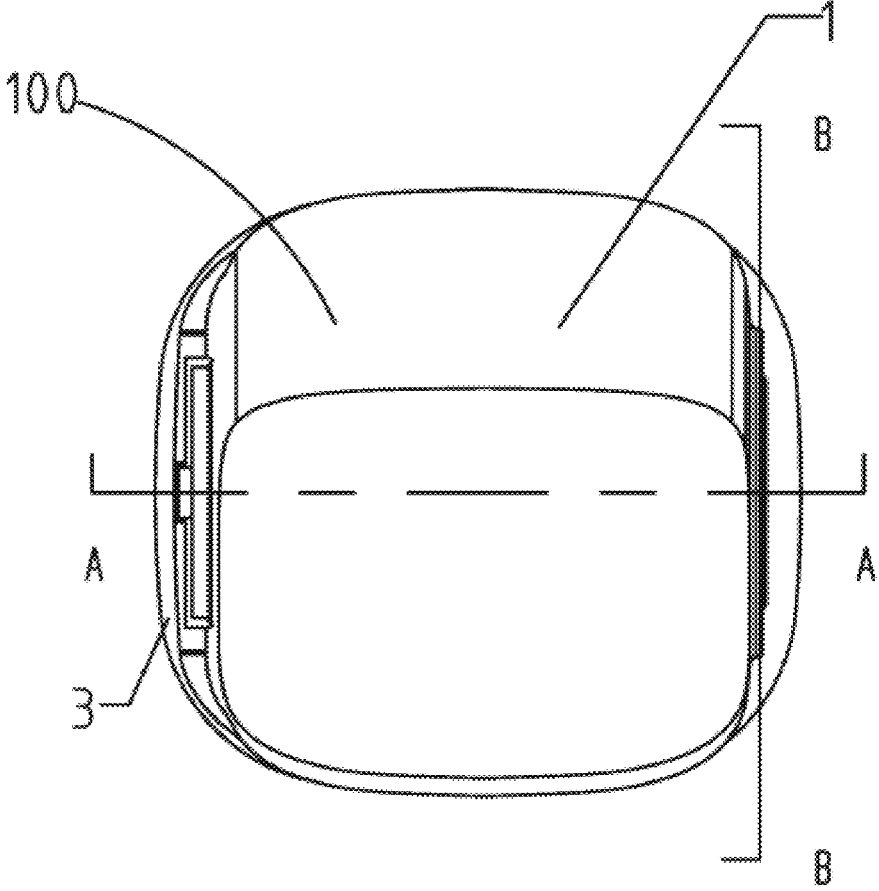
FIG. 3 illustrates a top view of the automatic cat excrement removing device in FIG. 1.
Figure 5:
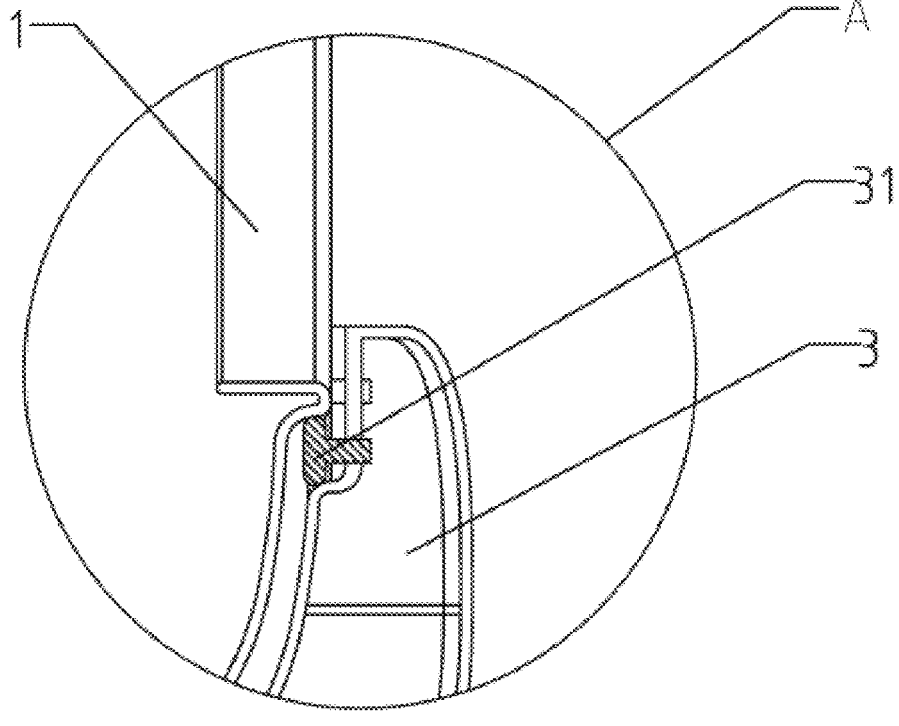
FIG. 5 illustrates a partial enlarged view of a part A in FIG. 4.
Figure 6:
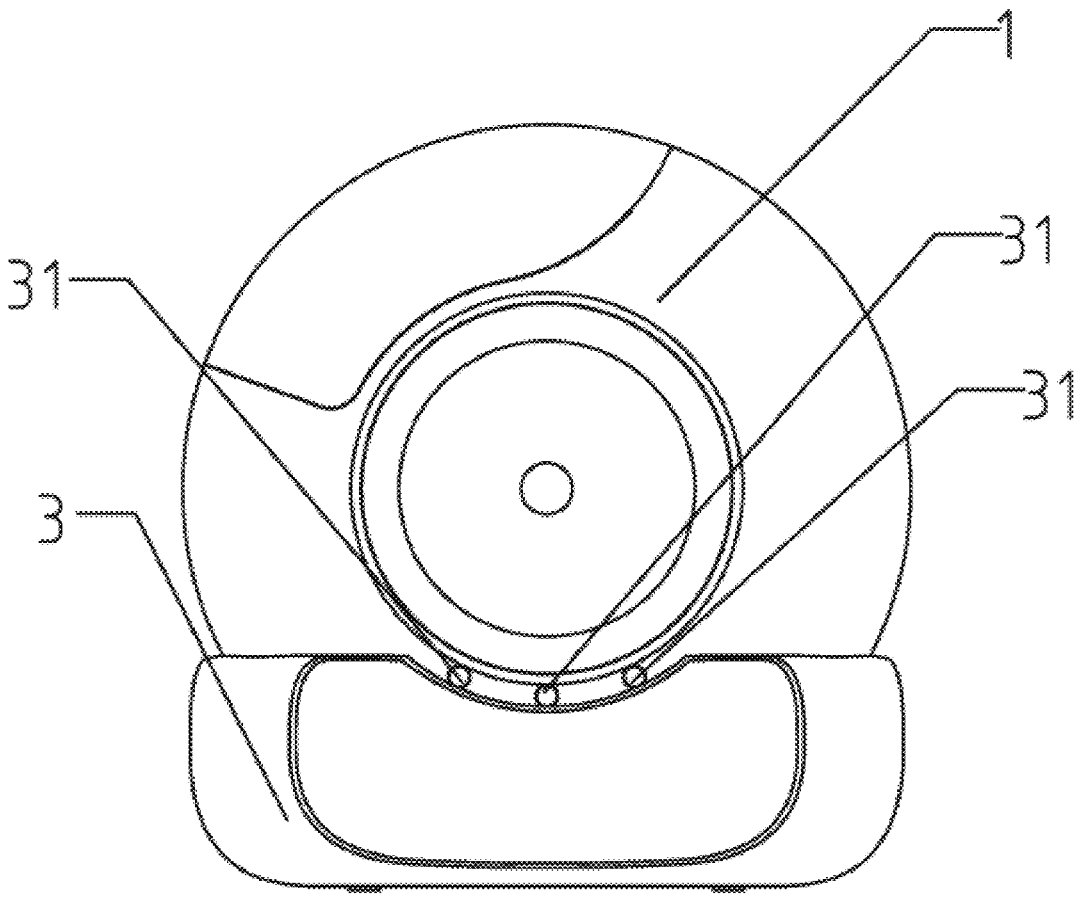
FIG. 6 illustrates a schematic cross-sectional view taken along an B-B line in FIG. 3.
Figure 7:
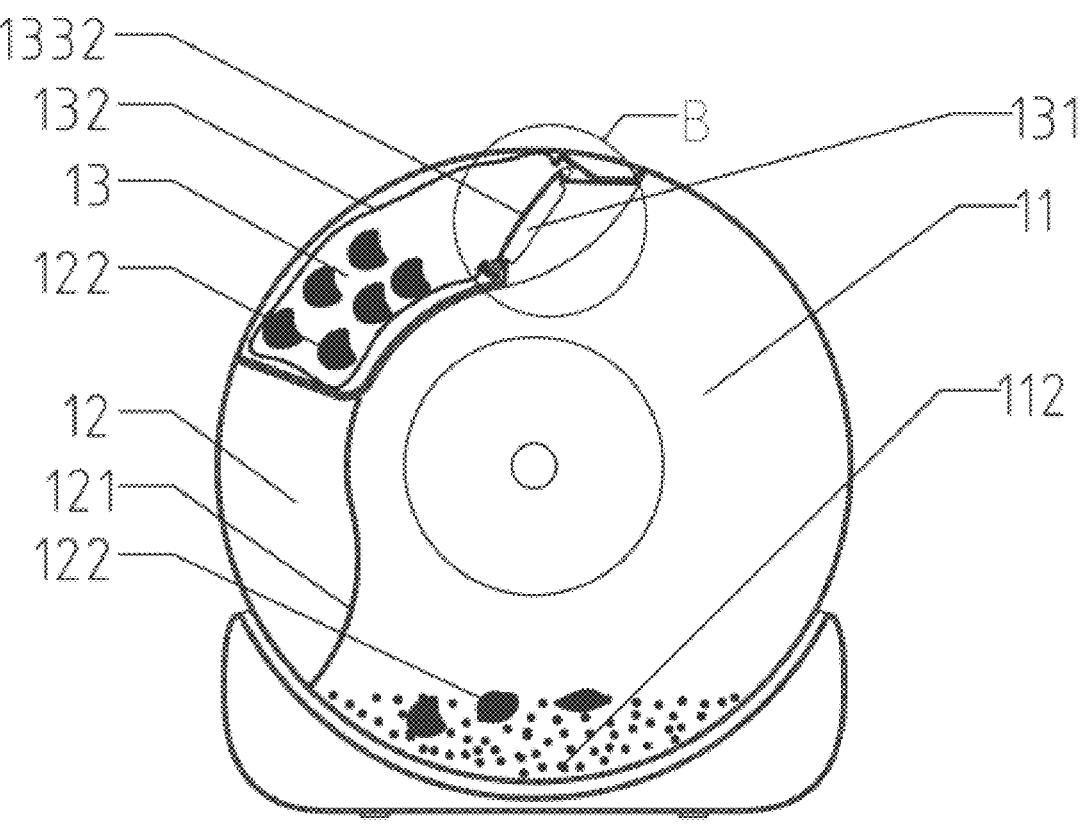
FIG. 7 illustrates a schematic diagram of a ball compartment assembly in an initial position.
Figure 9:
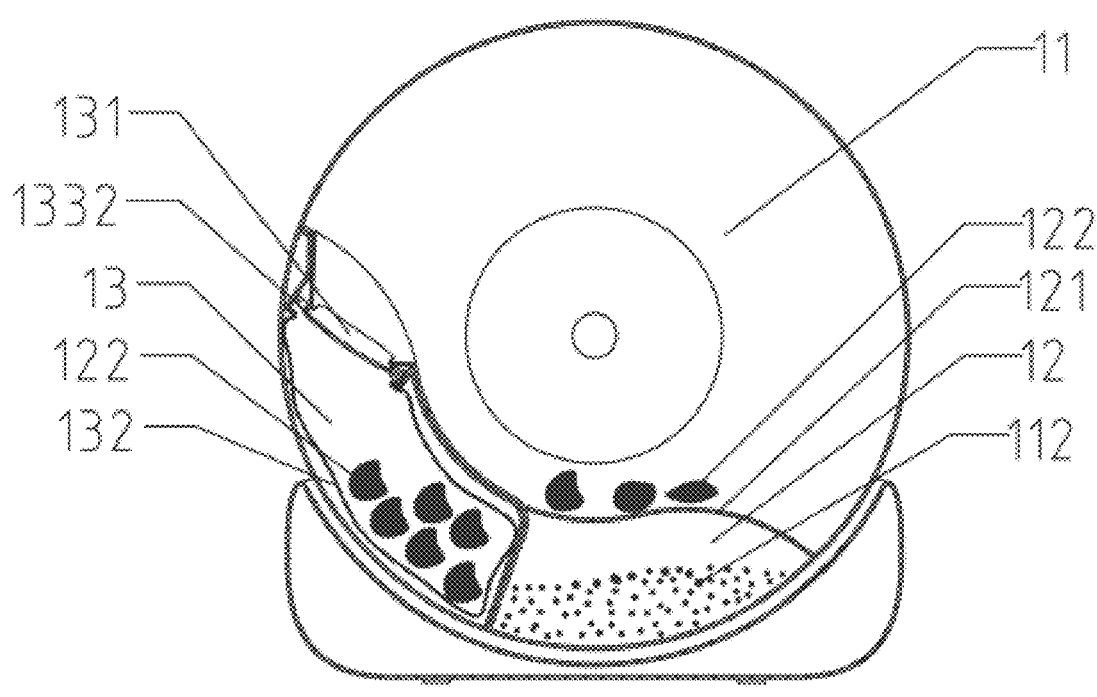
FIG. 9 illustrates a schematic diagram of a ball compartment assembly in a first position.
Figure 10:
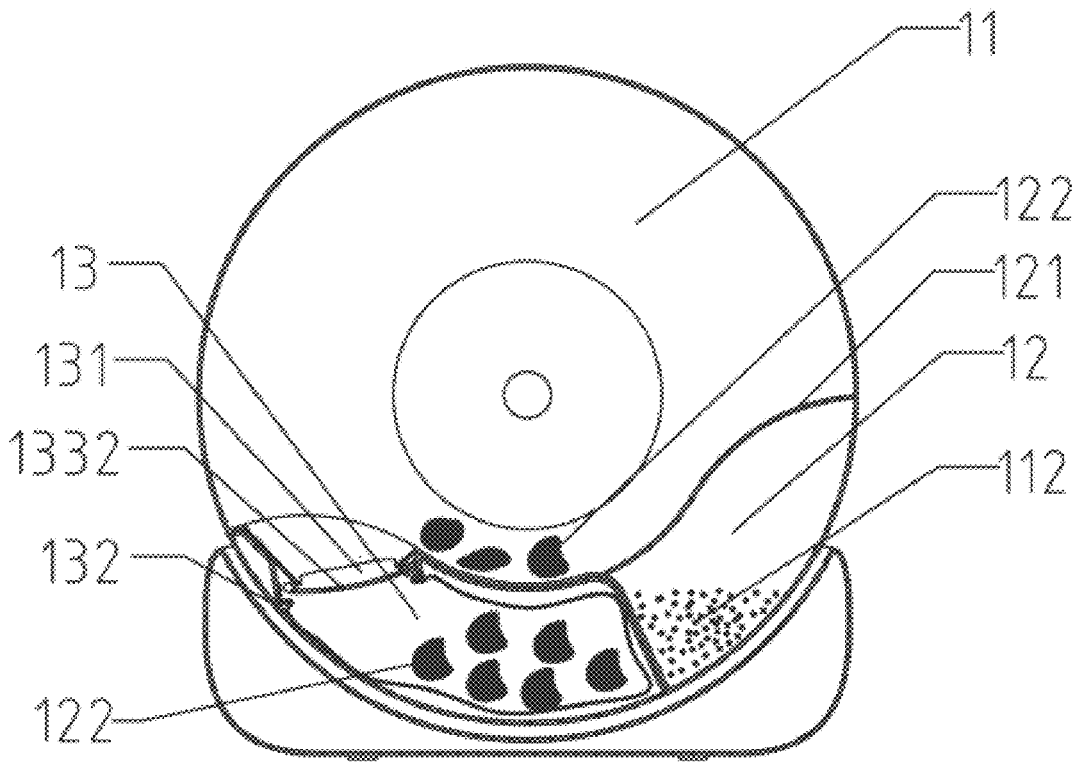
FIG. 10 to FIG. 12 illustrate schematic diagrams of a ball compartment assembly during rotation from a first position to a second position.
Figure 11:
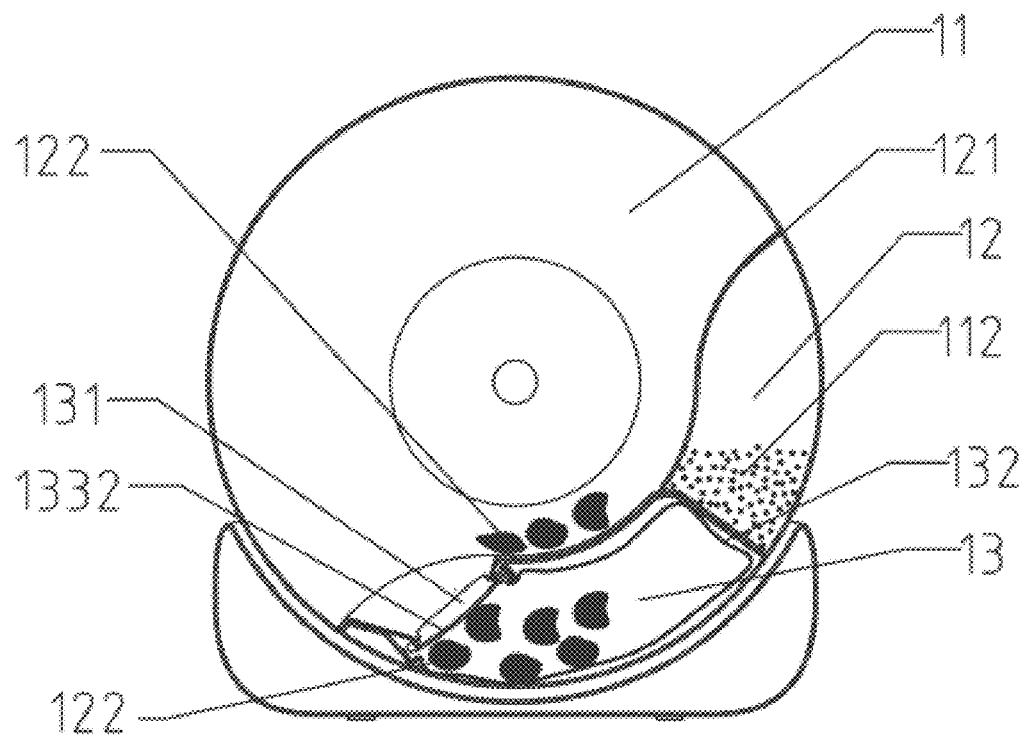
Figure 12:
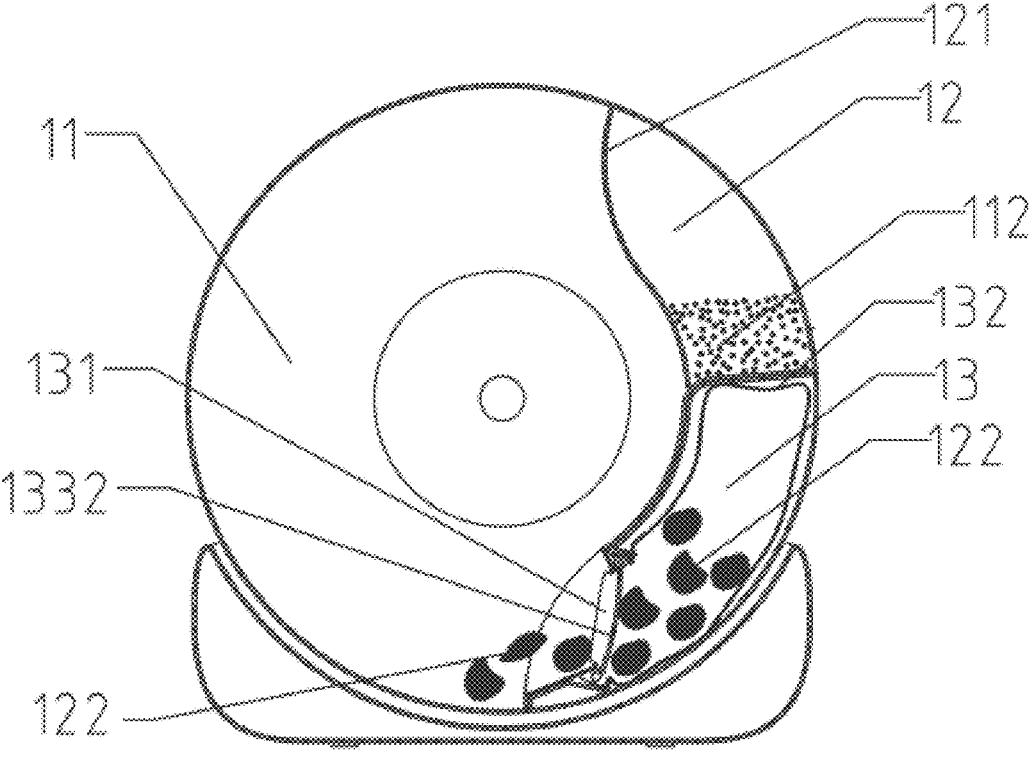

Generally, as shown in FIG. 1 to FIG. 7, according to the embodiment described herein, the automatic cat excrement removing device 100 of the present disclosure includes a ball compartment assembly 1, a driving assembly 2 and a pedestal 3. The ball compartment assembly 1 is configured to have at least three spaces including a working compartment 11 used for holding cat litter 112 and allowing a cat to excrete, a screening compartment 12 for screening cat litter 112 and cat excrement 122, and an excrement collection compartment 13 for holding cat excrement 122. A peripheral contour of the ball compartment assembly 1 is a shape of a revolving body, the peripheral contour of the ball compartment assembly is formed by the working compartment 11, the screening compartment 12 and the excrement collection compartment 13 together, and has a peripheral contour in the shape of a revolving body. The driving assembly 2 is configured to drive the ball compartment assembly 1 to automatically rotate. The surface of the screening compartment 12 facing the center of a circle of the ball compartment assembly 1 is provided with a plurality of screening holes 121. As shown in FIG. 1, the ball compartment assembly 1 is in an initial position at the moment; and the working compartment 11 is located at the lowest position of the ball compartment assembly 1. As shown in FIG. 7 and FIG. 9, when the ball compartment assembly 1 rotates to a first position from the initial position, the screening compartment 12 is located at the lowest position of the ball compartment assembly 1, so that the cat litter 112 falls into the screening compartment 12 through the plurality of screening holes 121, while the cat excrement 122 stays in the working compartment 11 because the size of the cat excrement is larger than a size each of the plurality of screening holes 121. As shown in FIG. 10 to FIG. 13, when the ball compartment assembly 1 rotates to a second position, the excrement collection compartment 13 is located at the lowest position of the ball compartment assembly 1, so that the cat excrement 122 falls into the excrement collection compartment 13. As shown in FIG. 2, the ball compartment assembly 1 is detachably mounted on the pedestal 3 and may rotate around its own axis relative to the pedestal 3.

According to the embodiments of the present disclosure, by means of dividing the ball compartment assembly 1 into at least three spaces, that is, integrating the working compartment 11, the screening compartment 12 and the excrement collection compartment 13 on the ball compartment assembly 1, the cat excrement 122 is screened, collected and stored in the ball compartment assembly 1, so that the entire automatic cat excrement removing device has a simple and compact structure, has a small device size, is portable, and has high space utilization. In addition, the cat excrement 122 is stored in the ball compartment assembly 1 all the time, so that other accessories are not polluted, the workload of a user for cleaning is reduced, and the user can clean the device conveniently. By means of designing the ball compartment assembly 1 to be in a spherical shape, the space utilization of the ball compartment assembly 1 reaches a highest state; and the space of the working compartment 11 is maximized, so that a cat conveniently enters the working compartment 11 to excrete. Since the ball compartment assembly 1 is mounted on the pedestal 3 and may be selectively separated from the pedestal 3, the user only needs to lift the ball compartment assembly 1 during cleaning, so as to achieve separation from the pedestal 3, so that the device is convenient for cleaning.

It is to be understood that, the ball compartment assembly 1 may be of a spherical structure, or may be of other structures of which peripheral contour is in the shape of a revolving body, such as an ellipsoidal shape, a cylindrical shape and a conic-cylindrical shape, as long as structures that may rotate around their axes under the driving of an external force all fall within the protection scope of the present disclosure. The ball compartment assembly 1 may be formed by geometrically splicing the working compartment 11, the screening compartment 12 and the excrement collection compartment 13, or may be formed by arranging the screening compartment 12 and the excrement collection compartment 13 into the working compartment 11, or may be formed by arranging one of the screening compartment 12 and the excrement collection compartment 13 into the working compartment 11 and then splicing the other one of the screening compartment and the excrement collection compartment. A connection relationship may be a spliced-connection relationship, may be a hinged-connection relationship, or may be other connection relationship such as a clamped-connection relationship. The three compartments may be partially hinged, partially spliced or partially integrated, or may be connected by selecting any one of connection modes, as long as the structure of the ball compartment assembly 1 that is formed by combining the three compartments together falls within the protection scope of the present disclosure. The screening holes 121 may be arranged regularly or irregularly; the surface of the screening compartment 12 facing the center of a circle of the ball compartment assembly 1 may or may not be distributed with the screening holes 121, as long as the distributed positions of the screening holes 121 can meet requirements that the cat litter 112 may completely fall into the screening compartment 12 when the screening compartment 12 is located at the lowest position of the ball compartment assembly 1 and the cat litter 112 may completely return back into the working compartment 11 when the working compartment 11 is located at the lowest position of the ball compartment assembly 1, all falling within the protection scope of the present disclosure.

In some embodiments, as shown in FIG. 1, the working compartment 11 is axially provided with an inlet 111, which is configured to allow the cat to enter and exit the working compartment 11 to excrete. As shown in FIG. 7, the excrement collection compartment 13 is provided with an opening 131, which is configured to allow the cat excrement 122 to fall into the excrement collection compartment 13.

In some embodiments, since the working compartment 11, the screening compartment 12 and the excrement collection compartment 13 are integrated on the ball compartment assembly 1, the ball compartment assembly 1 is nearly attached to the ground, and the height of the inlet of the working compartment 11 does not exceed 10 cm, facilitating the entering and exiting of older cats or fatter cats. In addition, since the height of the inlet 111 is relatively low, the cat does not need to jump during entering and exiting, so that the problem of the cat litter 112 being brought out in large quantities in the related art is solved fundamentally. The inlet 111 for the cat to enter the working compartment 11 always maintains a relatively-stationary state with the opening 131 of the excrement collection compartment 13, and the excrement collection compartment 13 always moves with the ball compartment assembly 1, and since the inlet 111 for the cat is set in the axial direction and the inlet 111 is distributed in the rotation center of the ball compartment assembly 1, the inlet 111 will not overlap with other stationary parts when the ball compartment assembly 1 is rotating, so the entire automatic cat excrement removing device 100 has no other holes or channels where misalignment occurs, and a mechanical shearing action does not exist. In this way, cat-clamping accidents do not occur even if a sensing apparatus 4 fails and the ball compartment assembly 1 starts to rotate when the cat is in the ball compartment assembly 1, so that the entire device is safe and reliable, the possibility that the cat is clamped is eliminated from the root, and problems such as greatly increased costs or complex procedures prone to errors caused by the addition of various safety measures are avoided. In addition, the cat excrement 122 directly falls into the excrement collection compartment 13 by means of the opening 131 of the excrement collection compartment 13 without disposing a special channel, so that convenient cleaning is achieved, there is no cleaning dead corners, so that there is no problem in the art known to inventors that the cat excrement cannot smoothly enters the excrement collection compartment caused by incomplete alignment and overlapping of the channel port due to rotation errors does not occur, or there is no problem that, when the cat excrement is fully accumulated or sticked near the channel port, the cat excrement is squeezed and smeared everywhere by the relatively-misaligned and relatively-rotating channel port and cannot be cleaned.

Figure 13:
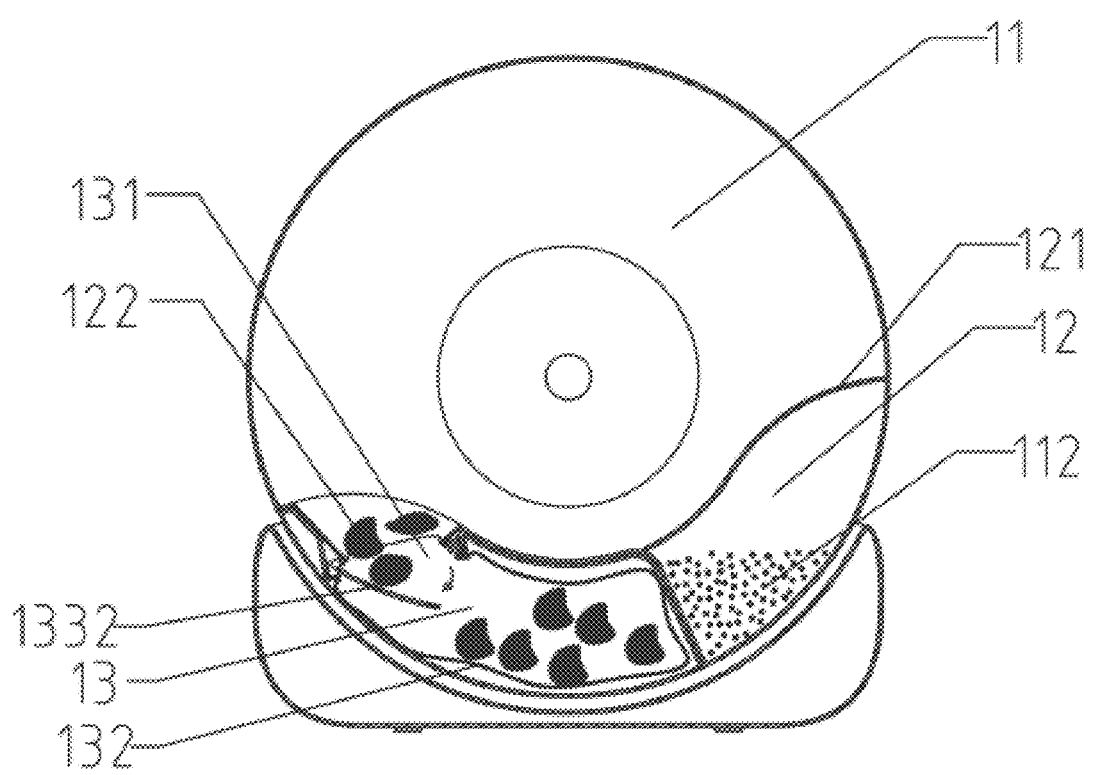
FIG. 13 illustrates a schematic diagram of a ball compartment assembly in a second position.

In some embodiments, as shown in FIG. 7, the working compartment 11 is disposed opposite to the screening compartment 12; and the excrement collection compartment 13 is located on one side of the screening compartment 12. As shown in FIG. 9, when the screening compartment 12 is located at the lowest position of the ball compartment assembly 1, the excrement collection compartment 13 is located at a secondary lowest point position of the ball compartment assembly 1, while the working compartment 11 is located near the highest position of the ball compartment assembly 1. As shown in FIG. 13, when the excrement collection compartment 13 is located at the lowest position of the ball compartment assembly 1, the screening compartment 12 is located at a secondary lowest point position of the ball compartment assembly 1, while the working compartment 11 is located near the highest position of the ball compartment assembly.

By means of disposing the working compartment 11 opposite to the screening compartment 12 and disposing the excrement collection compartment 13 on one side of the screening compartment 12, when the ball compartment assembly 1 is driven by the driving assembly 2 to rotate until the screening compartment 12 is located at the lowest position of the ball compartment assembly 1, the cat litter 112 falls into the screening compartment 12 through the screening holes 121, and the cat excrement 122 completely stays outside the screening compartment 12. Then when the ball compartment assembly 1 rotates until the excrement collection compartment 13 is located at the lowest position of the ball compartment assembly 1, the cat excrement 122 falls into the excrement collection compartment 13. When the ball compartment assembly 1 then rotates until the working compartment 11 is located at the lowest position of the ball compartment assembly 1, the cat litter 112 falls back into the working compartment 11 from the screening compartment 12, and then the ball compartment assembly 1 stops rotating and waits for the next operation. By means of specializing the relative position of the working compartment 11, the screening compartment 12 and the excrement collection compartment 13, a series of actions of screening, collection and storage of cat excrement 122 and returning of cat litter 112 may be smoothly performed in order during the rotation of the ball compartment assembly 1, a desirable screening effect is achieved, an excrement output structure is saved, and requirements for a driving mechanism are lowered, thereby reducing costs. In addition, the device is simple in structure and high in stability. In an initial state, the excrement collection compartment 13 is located at the top of the ball compartment assembly 1, so that the user can directly clean the excrement collection compartment 13 without squatting down, including replacing a rubbish bag 132 for the excrement collection compartment 13, removing waste cat litter 112, and the like.

Figure 21:
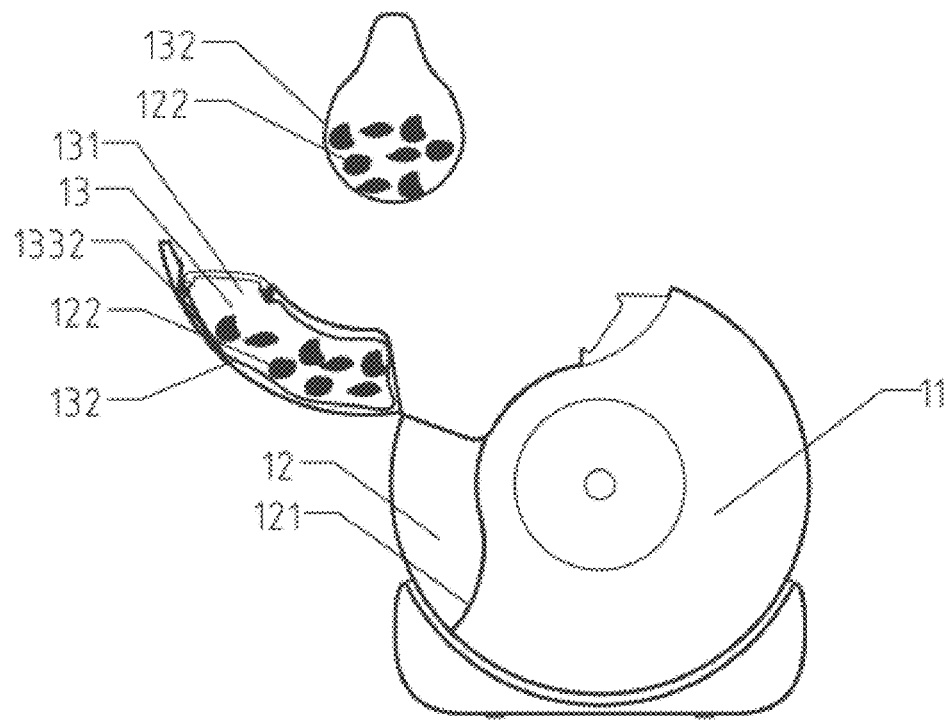
FIG. 21 illustrates a schematic diagram that a user takes out a rubbish bag in an excrement collection compartment.
Figure 22:
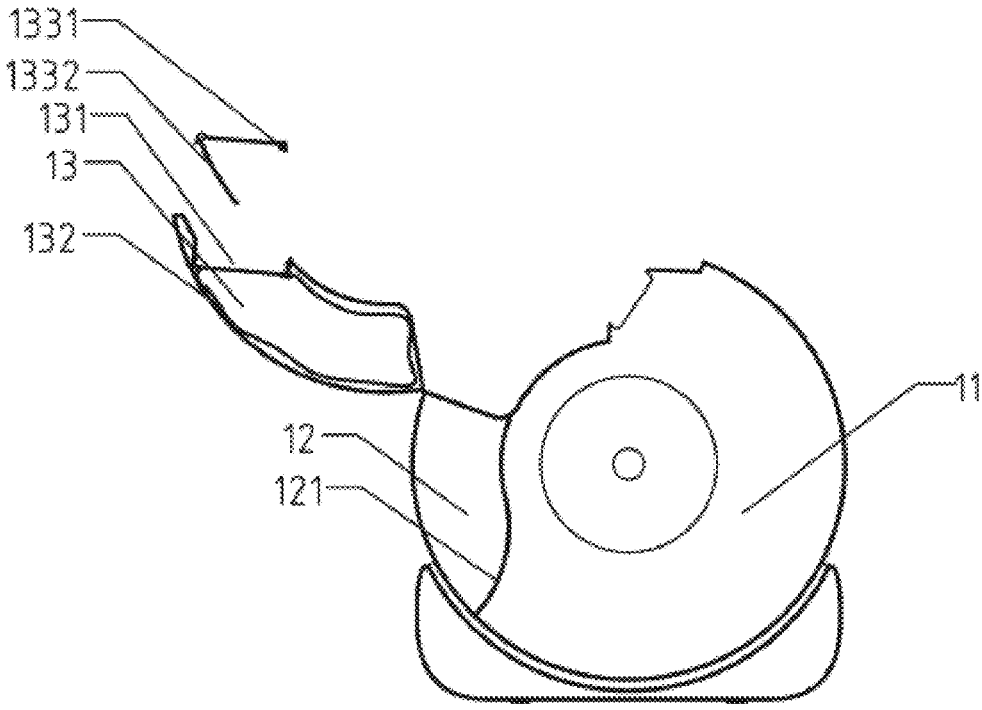
FIG. 22 illustrates a schematic diagram that a user turns an excrement collection compartment outwards and takes down an excrement collection compartment cover plate assembly.

In some embodiments, as shown in FIG. 21 and FIG. 22, an end of the excrement collection compartment 13 is hinged to the working compartment 11, and is configured to turn outwards relative to the working compartment 11.

By means of hinging the excrement collection compartment 13 to the working compartment 11, the rubbish bag 132 can be covered in the excrement collection compartment 13, so that the user may turn the excrement collection compartment 13 outwards relative to the working compartment 11, so as to cover or take down the rubbish bag 132, thereby conveniently removing the stored cat excrement 122. Then the user can not only pour new cat litter by means of the inlet 111 of the working compartment 11, but also turn the excrement collection compartment 13 outwards to pour the new cat litter into the working compartment 11 from the corresponding hole. The user may choose to squat or stand to carry out operations, so that there are diversified ways.

Figure 8:
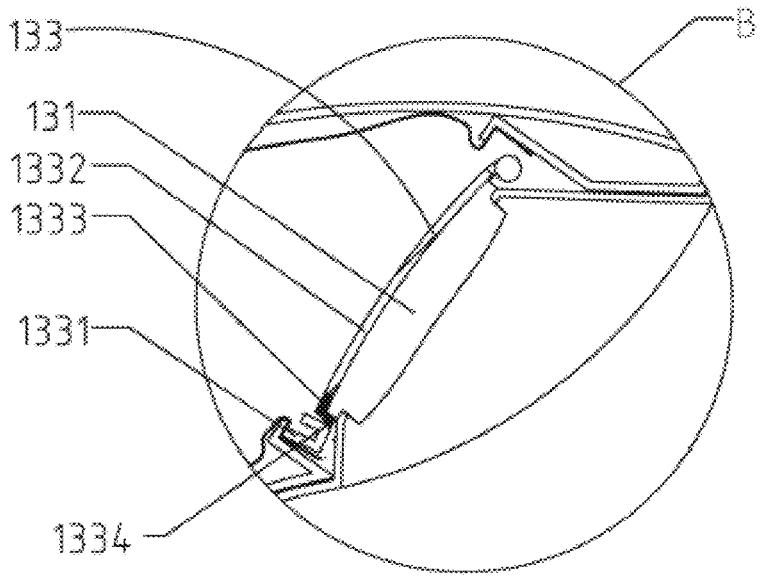
FIG. 8 illustrates a partial enlarged view of a part B in FIG. 7.
Figure 16:
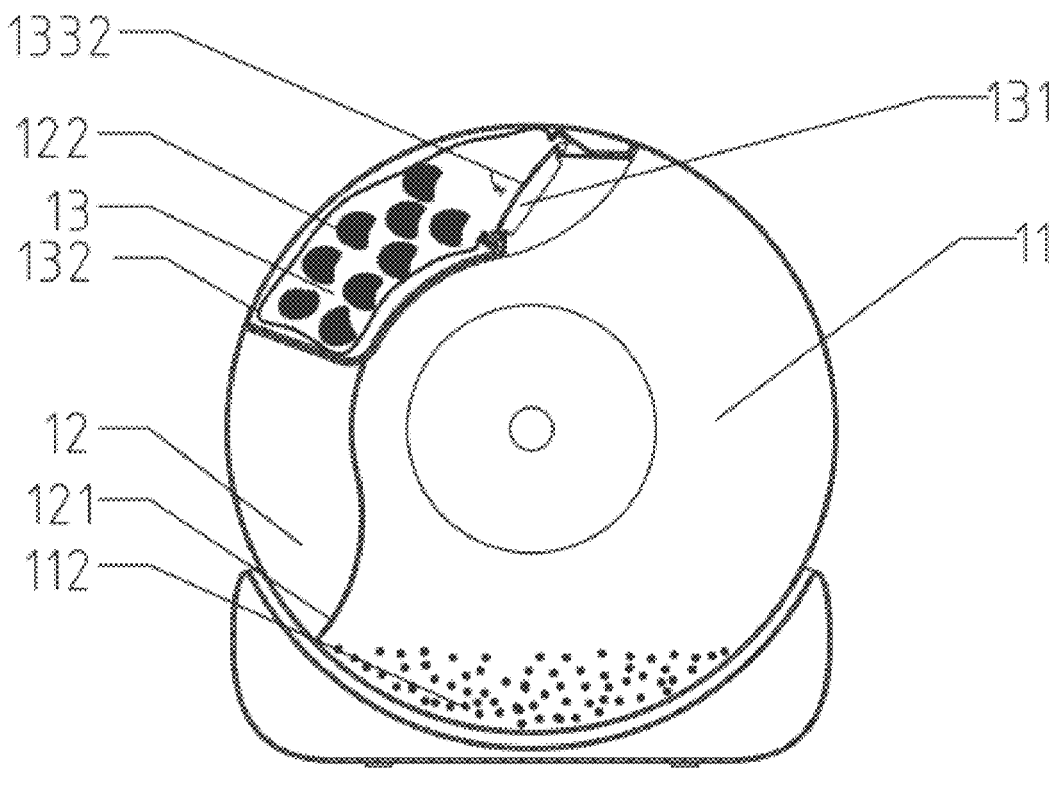
FIG. 16 illustrates a schematic diagram of a ball compartment assembly returning back to an initial position.

In some embodiments, as shown in FIG. 7, FIG. 8 and FIG. 21, an excrement collection compartment cover plate assembly 133 is disposed at the opening 131 of the excrement collection compartment 13, and is configured to selectively open or close the opening 131. The excrement collection compartment cover plate assembly 133 and a mounting mating surface of the opening 131 are configured to clamp an opening portion of a rubbish bag 132 and allow the rubbish bag 132 to maintain in an opening status. The excrement collection compartment cover plate assembly 133 includes: a base 1331, detachably connected to the opening 131; and a cover plate 1332, of which an end is hinged to the base 1331, and configured to be in an open state under the action of self-gravity of the cover plate 1332 when the excrement collection compartment 13 is at the lowest position of the ball compartment assembly 1, as shown in FIG. 13, and the cat excrement 122 falls into the excrement collection compartment 13 at the moment. When the excrement collection compartment 13 is at the highest position of the ball compartment assembly 1, as shown in FIG. 16, the cover plate 1332 returns to a closed state under the action of self-gravity, and the cat excrement 122 is locked in the excrement collection compartment 13 at the moment.

By means of disposing the excrement collection compartment cover plate assembly 133, the opening 131 is selectively opened or closed, to cause the excrement collection compartment 13 to be in a closed state when the cat excrement 122 does not need to be collected, so as to prevent the odor of the cat excrement 122 from exuding, thereby keeping the room fresh and hygienically clean. Using the self-gravity of the cover plate 1332 to achieve the opening and closing of the cover plate 1332 greatly reduces costs while the opening 131 is selectively opened or closed. In addition, the device is mature in technology and high in stability. By means of using the excrement collection compartment cover plate assembly 133 and the mounting mating surface of the opening 131 to clamp the opening portion of the rubbish bag 132, a fixation mode is simple and stable; and the user only needs to take down the excrement collection compartment cover plate assembly 133 to cover the rubbish bag 132 or replace a new rubbish bag 132, which is convenient and fast. Since during the rotation of the ball compartment assembly 1, the excrement collection compartment 13 revolves around the center of a circle of the ball compartment assembly 1, and the cat excrement 122 stored in the excrement collection compartment 13 is inverted and rearranged during rotation, so that the cat excrement is not accumulated near the excrement collection compartment cover plate assembly 133, and problems that the capacity of the excrement collection compartment 13 cannot be fully utilized or a false alarm of the capacity is called cannot occur, thereby guaranteeing the normal operation of the automatic cat excrement removing device 100. When the excrement collection compartment 13 is full, the cat excrement 122 in the working compartment 11 cannot enter the excrement collection compartment 13, then the automatic cat excrement removing device 100 stops the operation of automatically screening the cat excrement 122 without affecting a cat to normally use the automatic cat excrement removing device 100, so that the cat still may enter the working compartment 11 to excrete.

It is to be understood that, the excrement collection compartment 13 can be hinged to the working compartment 11, or can be clamped on the working compartment 11, as long as a connection relationship between the excrement collection compartment and the working compartment is detachable, all falling within the protection scope of the present disclosure. The rubbish bag 132 can be covered on the base 1331, or can be covered on the opening 131, as long as, when the base 1331 is connected to the opening 131, the opening end of the rubbish bag 132 is fixed between the opening 131 and the base 1331, so as to fix the opening end of the rubbish bag 132, all falling within the protection scope of the present disclosure. The structure of the excrement collection compartment cover plate assembly 133 is not limited to the structures of the cover plate 1332 and the base 1331, or may be a structure that a motor drives a baffle plate to telescope, so as to selectively open or close the opening 131, or other structures that can achieve the same function, all falling within the protection scope of the present disclosure.

In some embodiments, as shown in FIG. 7 to FIG. 16, the excrement collection compartment cover plate assembly 133 further includes: a first magnet 1333 and a second magnet 1334. The first magnet 1333 disposed on a free end of the cover plate 1332. The second magnet 1334 is disposed at a position corresponding to the base 1331, and is configured to guarantee the cover plate 1332 and the base 1331 to be always in a locking state during the rotation of the ball compartment assembly 1 from the initial position to the second position. When the ball compartment assembly 1 returns to the initial position, the cover plate 1332 rests on the base 1331 again under the action of self-gravity, and at the moment, the first magnet 1333 and the second magnet 1334 are re-adsorbed to reinforce a locking force between the cover plate 1332 and the base 1331. During a process that the ball compartment assembly 1 rotates from the initial position to the second position, the cover plate 1332 is guaranteed to be always adsorbed on the base 1331, and does not hang freely due to the action of the self-gravity of the cover plate 1332, so as to ensure that the excrement collection compartment 13 is sustainably sealed until the ball compartment assembly 1 rotates to the second position. During a process that the ball compartment assembly 1 reversely rotates from the second position to the initial position, the superposition of the cat excrement 122 and the self-gravity of the cover plate 1332 exceeds the magnetic force of the first magnet 1333 and the second magnet 1334, so that the cover plate 1332 is opened in a pivoted manner, and then the cat excrement 122 falls into the excrement collection compartment 13. When the ball compartment assembly 1 returns to the initial position, the cover plate 1332 rests on the base 1331 again under the action of self-gravity, so that the first magnet 1333 and the second magnet 1334 are adsorbed again, so as to further reinforce the locking force between the cover plate 1332 and the base 1331.

Figure 4:
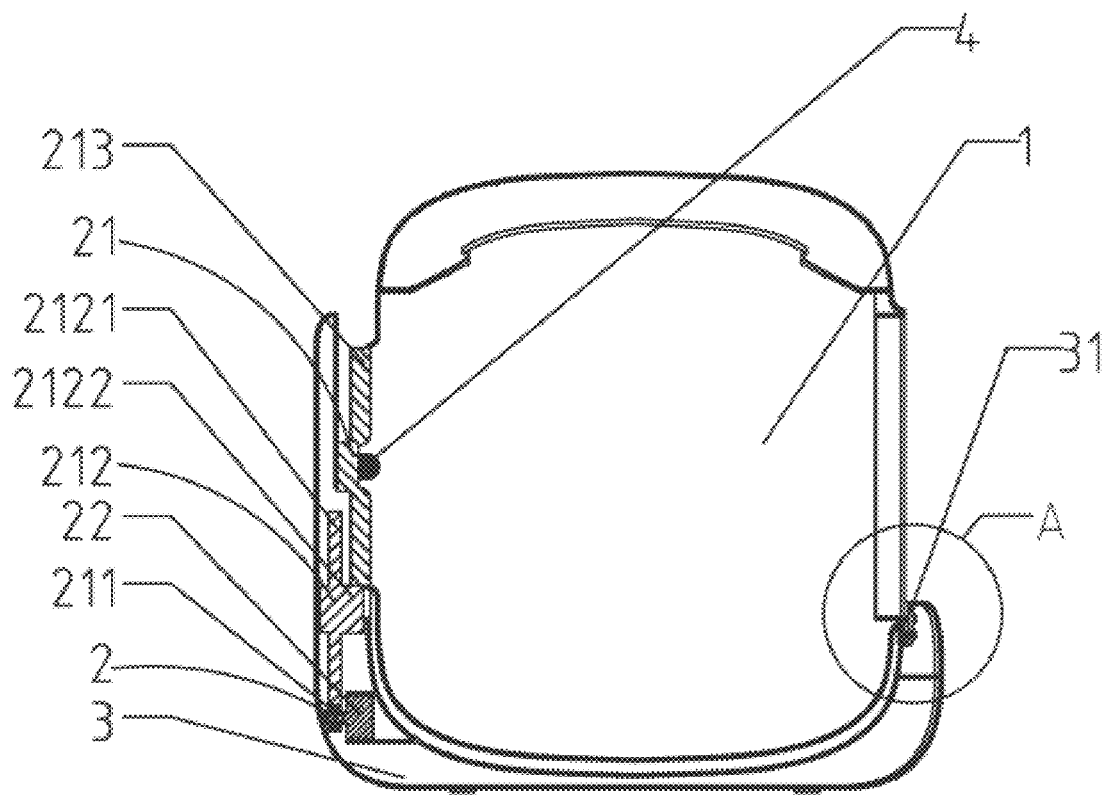
FIG. 4 illustrates a schematic cross-sectional view taken along an A-A line in FIG. 3.

In some embodiments, as shown in FIG. 4, the automatic cat excrement removing device further includes: a sensing apparatus 4, configured to start, when the cat is sensed to leave the working compartment 11, the driving assembly 2 to drive the ball compartment assembly 1 to rotate from the initial position to the second position via the first position, until the cat excrement 122 falls into the excrement collection compartment 13.

The sensing apparatus 4 is disposed and configured to sense whether the cat has entered the working compartment 11 to excrete, and sense whether the cat has left the working compartment 11. When sensing that the cat has left the working compartment 11, the sensing apparatus 4 sends a signal to the driving assembly 2 to start the driving assembly 2, so as to drive the ball compartment assembly 1 to rotate to the second position from the initial position via the first position; and during the rotation of the ball compartment assembly 1, the screening compartment 12 and the excrement collection compartment 13 successively pass through the lowest position of the ball compartment assembly 1, until all cat excrement 122 falls into the excrement collection compartment 13. Therefore, the automatic cat excrement removing device 100 may be prevented from being accidentally started to operate when the cat excretes, thereby guaranteeing use safety.

Figure 14:
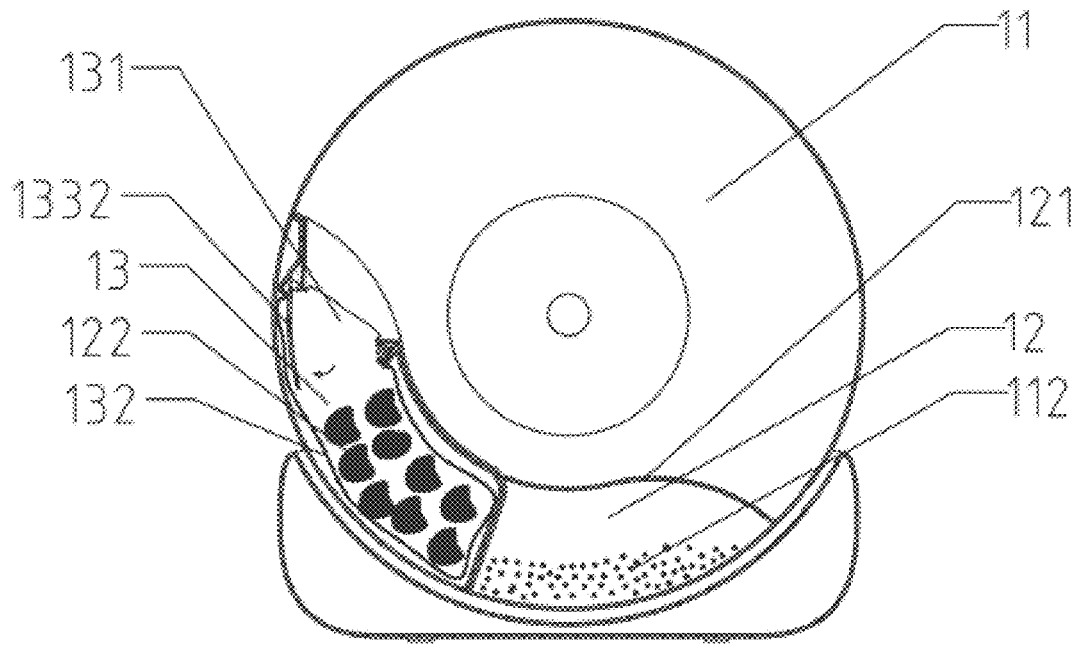
FIG. 14 to FIG. 15 illustrate schematic diagrams of a ball compartment assembly during rotation from a second position to an initial position.
Figure 15:
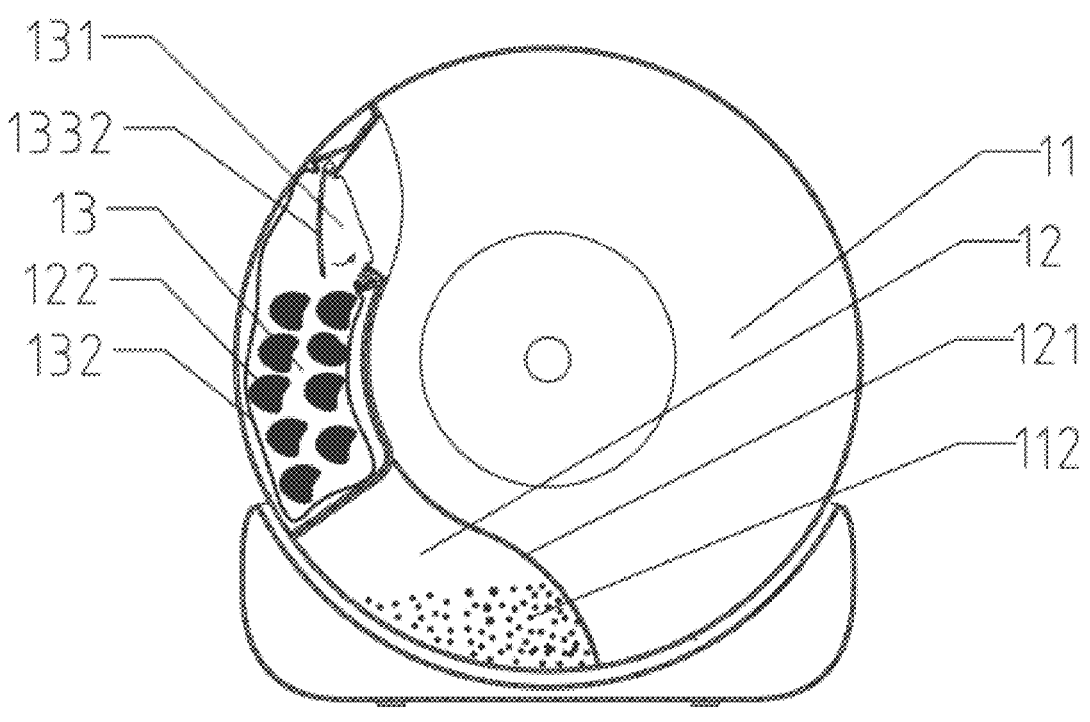

A working process of removing the cat excrement includes the following. As shown in FIG. 7, when the ball compartment assembly 1 is at the initial position, the working compartment 11 is located at the lowest position of the ball compartment assembly 1, so that the cat conveniently enters, by means of the inlet 111, the working compartment 11 to excrete; when the cat enters the working compartment 11 and then leaves the working compartment 11, the sensing apparatus 4 senses that the cat leaves the working compartment 11, and then sends the signal to the driving assembly 2 to start the driving assembly 2, so as to drive the ball compartment assembly 1 to rotate; when the ball compartment assembly 1 rotates to the first position from the initial position, as shown in FIG. 9, the screening compartment 12 is located at the lowest position of the ball compartment assembly 1, so that the cat litter 112 falls into the screening compartment 12 through the screening holes 121, and the cat excrement 122 stays in the working compartment 11; when the ball compartment assembly 1 rotates to the second position from the first position, as shown in FIG. 10 to FIG. 13, the excrement collection compartment 13 is located at the lowest position of the ball compartment assembly 1, and the cover plate 1332 is in the open state, so that the cat excrement 122 falls into the excrement collection compartment 13 by means of the opening 131; when the ball compartment assembly 1 rotates to the first position from the second position, as shown in FIG. 14 and FIG. 15, the cat excrement 122 staying on or near the cover plate 1332 completely falls into the excrement collection compartment 13 under the action of the self-gravity of the cat excrement 122; when the ball compartment assembly 1 continuously rotates back to the initial position, as shown in FIG. 16, the working compartment 11 is located at the lowest position of the ball compartment assembly 1, the cat litter 112 completely falls back into the working compartment 11 by means of the screening holes 121 of the screening compartment 12, the driving assembly 2 stops operating, and the inlet 111 returns to the initial position, so that the cat conveniently enters the working compartment 11 to excrete.

It is to be understood that, the sensing apparatus 4 may be one or more of microwave radar, a pyroelectric infrared sensor, a thermopile infrared sensor, an infrared intrusion detector and a light-sensing sensor. The rotation of the ball compartment assembly 1 to complete the removing of the cat excrement 122 once is only exemplary, the ball compartment assembly 1 may rotate 360° counterclockwise or clockwise, or may first rotate 270° counterclockwise and then rotate 270° clockwise, or may first rotate 270° clockwise and then rotate 270° clockwise. The rotation direction, rotation angle and rotation number of the ball compartment assembly 1 depend on the relative positions of the working compartment 11, the screening compartment 12 and the excrement collection compartment 13, as long as rotation modes that a series of actions of screening, collection and storage of cat excrement 122 and returning of cat litter 112 can be realized by means of the rotation of the ball compartment assembly 1 all fall within the protection scope of the present disclosure.

In some embodiments, as shown in FIG. 1, the automatic cat excrement removing device 100 further includes: a litter-cleaning module 5, configured to start, when a user starts the litter-cleaning module 5, the driving assembly 2 to drive the ball compartment assembly 1 to reversely rotate from the initial position to the first position via the second position, until the cat litter 112 completely falls into the excrement collection compartment 13.

By means of disposing the litter-cleaning module 5, the user starts the litter-cleaning module 5, and then the driving assembly 2 receives the signal to drive the ball compartment assembly 1 to reversely rotate to the first position from the initial position via the second position, until the cat litter 112 completely falls into the excrement collection compartment 13; then the ball compartment assembly 1 stops operating when continuously rotating back to the initial position, so that waste cat litter 112 may be automatically collected. Therefore, the user only needs to clean the excrement collection compartment 13 or the rubbish bag 132 in the excrement collection compartment 13 after a litter-cleaning action is completed, so that the device is convenient, fast, clean and hygienic.

Figure 17:
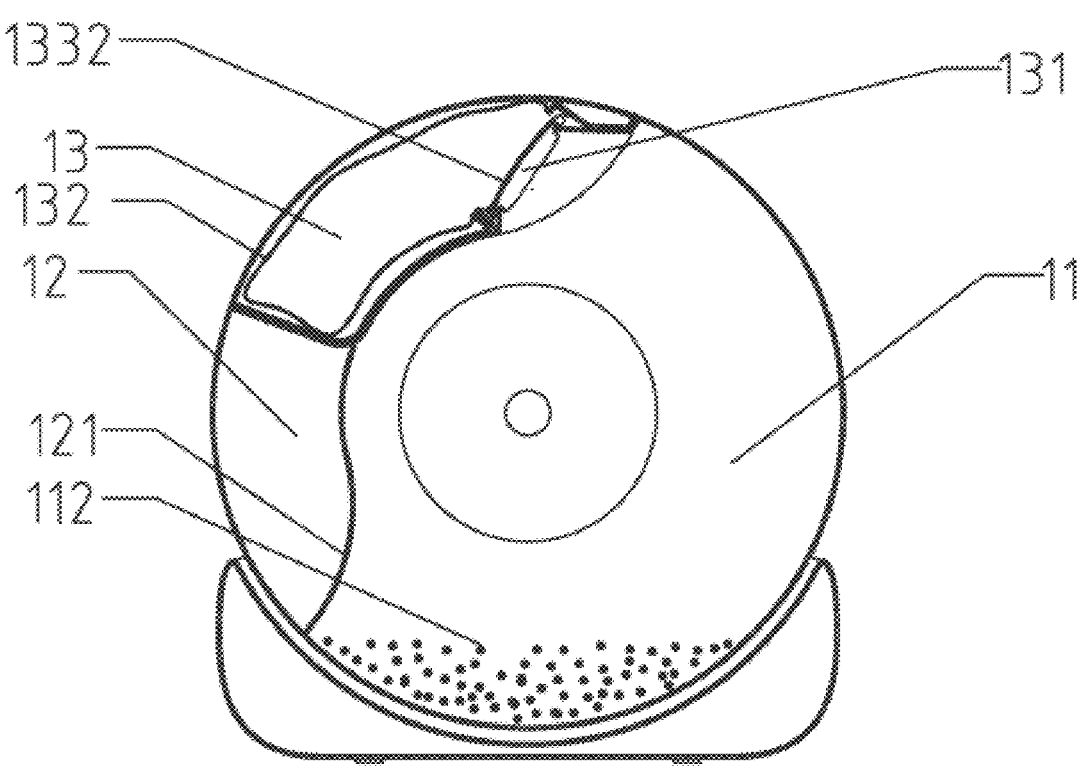
FIG. 17 illustrates a schematic diagram of a ball compartment assembly in an initial position under a litter-cleaning mode.
Figure 18:
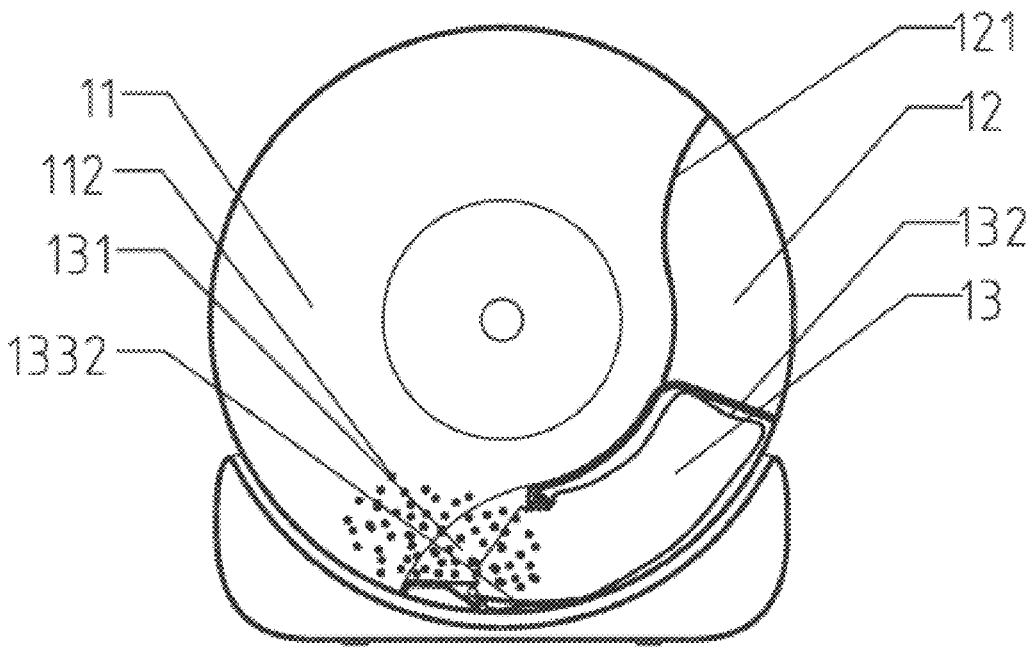
FIG. 18 illustrates a schematic diagram of a ball compartment assembly in a second position under a litter-cleaning mode.
Figure 19:
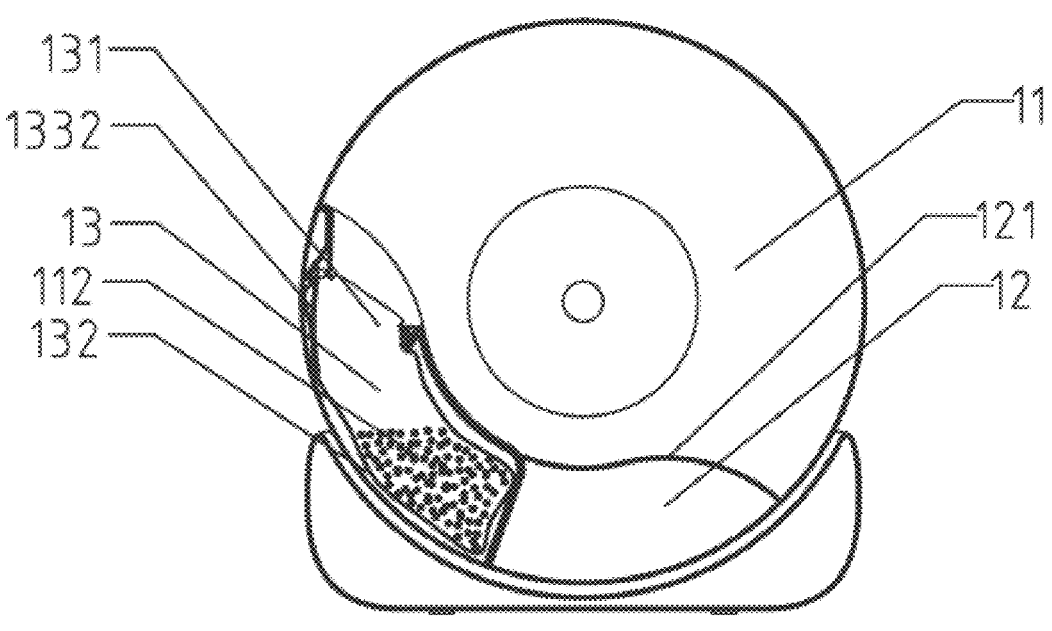
FIG. 19 illustrates a schematic diagram of a ball compartment assembly in a first position under a litter-cleaning mode.
Figure 20:
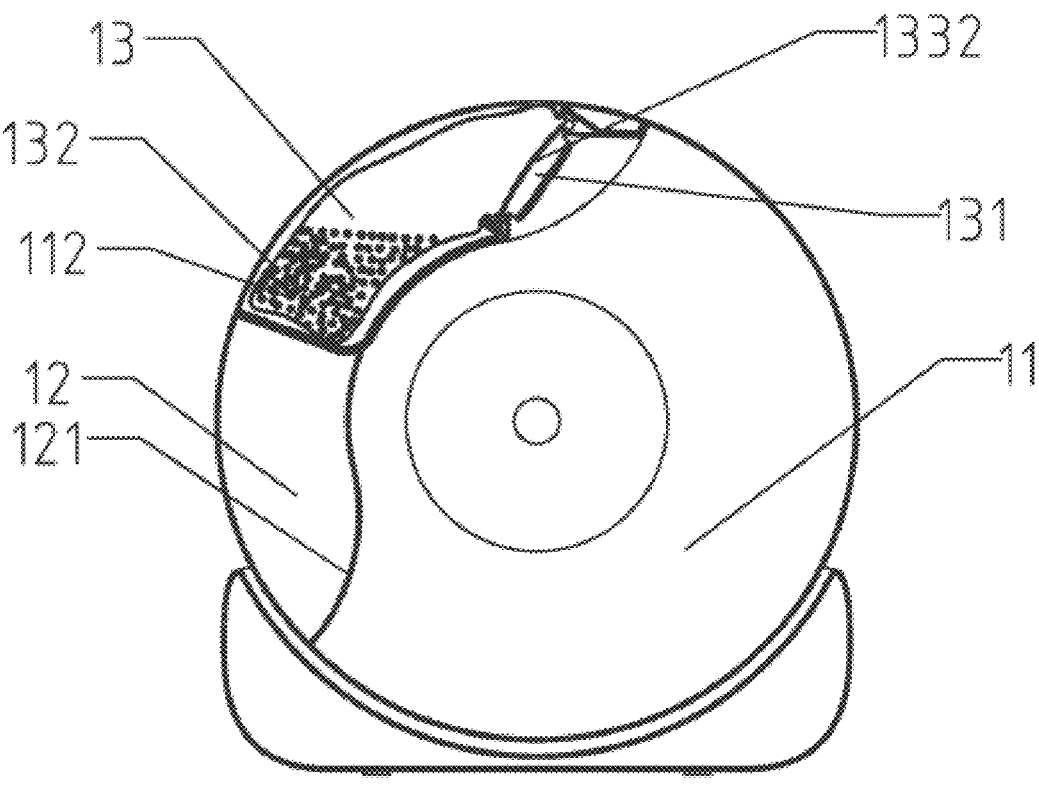
FIG. 20 illustrates a schematic diagram of a ball compartment assembly returning back to an initial position under a litter-cleaning mode.

A specific litter-cleaning working process includes the following. As shown in FIG. 17, when the ball compartment assembly 1 is at the initial position, the working compartment 11 is located at the lowest position of the ball compartment assembly 1, when the cat litter 112 needs to be replaced, the user starts the litter-cleaning module 5, and then the driving assembly 2 receives the signal to drive the ball compartment assembly 1 to reversely rotate; when the ball compartment assembly 1 reversely rotates to the second position from the initial position, as shown in FIG. 18, the excrement collection compartment 13 is located at the lowest position of the ball compartment assembly 1, so that the cat litter 112 falls into the excrement collection compartment 13 by means of the opening 131; when the ball compartment assembly 1 continuously rotates to the first position, as shown in FIG. 19, the cat litter 112 staying on or near the cover plate 1332 completely falls into the excrement collection compartment 13 under the action of the self-gravity; and when the ball compartment assembly 1 rotates back to the initial position, as shown in FIG. 20, the working compartment 11 is located at the lowest position of the ball compartment assembly 1, the driving assembly 2 stops operating, and the inlet 111 returns to the initial position, so that the user may take out the cat litter 112 in the excrement collection compartment 13 by turning the excrement collection compartment 13.

It is to be understood that, the litter-cleaning module 5 may be a button or a touch key disposed on the automatic cat excrement removing device 100, or may be a module remotely controlled by means of BLUETOOTH®, Wi-Fi and smart phone apps, as long as the modules that can send a litter-cleaning signal to the driving assembly 2 all fall within the protection scope of the present disclosure. The ball compartment assembly 1 may rotate clockwise or counterclockwise, or may rotate clockwise and counterclockwise in a staggered manner, and may rotate one circle, or may rotate a plurality of circles, as long as rotation modes that the cat litter 112 can be completely collected to the excrement collection compartment 13 all fall within the protection scope of the present disclosure.

In some embodiments, as shown in FIG. 4, the driving assembly 2 includes: a motor 22 and a gear assembly 21. The motor 22 fixedly disposed on the pedestal 3. One end of the gear assembly 21 is fixed disposed on an output end of the motor 22, and the other end of the gear assembly 21 is selectively connected to the ball compartment assembly 1, and the gear assembly 21 is configured to drive the ball compartment assembly 1 to rotate under the driving of the motor 22. As shown in FIG. 4, the gear assembly 21 includes a driving gear 211, a first driven gear 212 and a second driven gear 213. The first driven gear 212 consists of a large gear 2121 and a small gear 2122 that are coaxially and integrally arranged. One end of the driving gear 211 is connected to an output end of the motor 22, and the other end meshes with the large gear 2121 of the first driven gear 212. The small gear 2122 of the first driven gear 212 selectively meshes with the second driven gear 213. The second driven gear 213 is fixedly disposed on the ball compartment assembly 1. When the motor 22 drives the driving gear 211 to rotate, the driving gear 211 drives the large gear 2121 of the first driven gear 212 to rotate, and as the small gear 2122 of the first driven gear 212 is coaxial with the large gear 2121, the small gear simultaneously rotates, so as to drive the second driven gear 213 to rotate, thereby driving the ball compartment assembly 1 to rotate. When the user needs to clean the ball compartment assembly 1, the user only needs to lift the ball compartment assembly 1, to separate the second driven gear 213 from the small gear 2122 of the first driven gear 212, so as to achieve the separation of the ball compartment assembly 1 and the pedestal 3.

By means of the cooperation of the gear assembly 21 and the motor 22, the ball compartment assembly 1 is driven to rotate by using a mature technology, so that the device is mature in technology, simple in structure and low in cost.

It is to be understood that, the driving assembly 2 is only exemplary, and may also be in a manner of hydraulic driving, pneumatic driving or manual driving, as long as a driving mechanism that can drive the ball compartment assembly 1 to rotate falls within the protection scope of the present disclosure. The number and arrangement mode of gears of the gear assembly 21 are only exemplary, it may also be that the motor directly drives a single gear so as to drive the ball compartment assembly 1 to rotate, as long as a gear structure that can transmit the power of the motor 22 to the ball compartment assembly 1 falls within the protection scope of the present disclosure. Corresponding limit structures may be disposed on the ball compartment assembly 1 and the pedestal 3, so that the second driven gear 213 meshes with the small gear 2122 when the user mounts the ball compartment assembly 1 back to the pedestal 3 after cleaning.

In some embodiments, as shown in FIG. 4 to FIG. 6, an end of the pedestal 3 that is away from the gear assembly 21 is further provided with rolling wheels 31, which are configured to support the ball compartment assembly 21 when the ball compartment assembly 1 is mounted on the pedestal 3; and when the ball compartment assembly 1 rotates, the rolling wheels 31 simultaneously rotate around their own axis.

By means of disposing the rolling wheels 31, frictional resistance during rotation is reduced while a supporting force is provided for the ball compartment assembly 1, so that the ball compartment assembly 1 may smoothly rotate in a labor-saving manner, so as to reduce the abrasion of a machine, thereby prolonging the service life, and further improving effects of screening, collection and storage of cat excrement 122 and returning of cat litter 112.

It is to be noted that, terms used herein are intended to describe specific implementations only and are not intended to limit exemplary embodiments according to the present application. As used herein, unless the context clearly indicates otherwise, a singular form is also intended to include a plural form. In addition, it is further understood that when the terms "including" and/or "comprising" are used in this specification, the terms indicate the presence of features, steps, operations, devices, components, and/or a combination thereof.

In the description of the present application, it is to be understood that, terms such as "front, rear, up, down, left or right", "transverse, longitudinal, vertical, or horizontal", "top or bottom", and the like are usually based on the orientation or positional relationships shown in the drawings and are used only to facilitate and simplify the description of the present application. In the absence of any indication to the contrary, these orientation words do not indicate and imply that the device or component referred to must have a particular orientation or be constructed and operated in a particular orientation, and therefore cannot be construed as limiting the scope of protection of the present application.

The orientation word "inside or outside" refers to the inside and outside relative to the contours of the components themselves.

For ease of description, spatially relative terms such as "on . . . ," "above . . . ," "on an upper surface of . . . ," "upper," and the like may be used here to describe the spatial position relationship between a device or feature and other devices or features as shown in the figure. It is to be understood that, the spatially relative terms are intended to cover different orientations in use or operation other than the orientation of the device described in the figure. For example, if the devices in the drawings are inverted, the devices described as "above" or "on" other devices or configurations will later be positioned as "below" or "under" other devices or configurations. Therefore, the exemplary term "above . . . " may include both orientations of "above . . . " and "below . . . ". The device may also be positioned in other different ways (rotating 90 degrees or in other orientations), and the spatially relative descriptions used here are explained accordingly.

In addition, it is to be noted that, the use of words such as "first" and "second" to limit the parts is only to facilitate the distinguishing of corresponding parts, if not otherwise stated, the above words do not have a special meaning, and therefore cannot be understood as a limitation of the scope of protection of the present application.

The above are only the preferred embodiments of this application and are not intended to limit this application. For those skilled in the art, this application may have various modifications and variations. Any modifications, equivalent replacements, improvements and the like made within the spirit and principle of this application shall fall within the scope of protection of this application.

What is claimed is:

1. An automatic cat excrement removing device, comprising:
   a pedestal;
   a ball compartment assembly, wherein the ball compartment assembly is detachably mounted on the pedestal, wherein the ball compartment assembly has an axis and is configured to rotate around the axis relative to the pedestal, wherein a peripheral contour of the ball compartment assembly is a shape of a revolving body, wherein the peripheral contour of the ball compartment assembly is formed by a working compartment, a screening compartment, and an excrement collection compartment, wherein the excrement collection compartment is provided with an opening that is configured to allow cat excrement to fall into the excrement collection compartment, wherein an excrement collection compartment cover plate assembly is disposed at the opening of the excrement collection compartment, wherein the excrement collection compartment cover plate assembly is configured to selectively open or close the opening; wherein
   when the ball compartment assembly rotates to an initial position, the working compartment is located at a lowest position of the ball compartment assembly; when the ball compartment assembly rotates in a first direction to a first position from the initial position, the screening compartment is located at the lowest position of the ball compartment assembly, so that cat litter falls into the screening compartment through a plurality of screening holes, while the cat excrement stays in the working compartment because a size of the cat excrement is larger than a size of each of the plurality of screening holes; and when the ball compartment assembly rotates in the first direction from the first position to a second position, the excrement collection compartment is located at the lowest position of the ball compartment assembly, so that the cat excrement falls near the opening of the excrement collection compartment; when the ball compartment assembly rotates continuously in a second direction from the second position to the first position, the cat excrement falls into the excrement collection compartment due to self-gravity of the cat excrement; when the ball compartment assembly rotates continuously back to the initial position from the first position, the cat litter falls into the working compartment through the screening holes of the screening compartment.

2. The automatic cat excrement removing device as claimed in claim 1, wherein the working compartment is axially provided with an inlet, which is configured to allow a cat to enter and exit the working compartment.

3. The automatic cat excrement removing device as claimed in claim 2, wherein a height of the inlet of the working compartment does not exceed 10 cm.

4. The automatic cat excrement removing device as claimed in claim 1, wherein the working compartment is disposed opposite to the screening compartment; and the excrement collection compartment is located on a side of the screening compartment, and is configured to cause the working compartment to be located near a highest position of the ball compartment assembly when the screening compartment or the excrement collection compartment is located at a lowest position of the ball compartment assembly.

5. The automatic cat excrement removing device as claimed in claim 1, wherein an end of the excrement collection compartment is hinged to the working compartment, and is configured to turn outwards relative to the working compartment.

6. The automatic cat excrement removing device as claimed in claim 1, wherein the excrement collection compartment cover plate assembly and a mounting mating surface of the opening are configured to clamp an opening portion of a rubbish bag and allow the rubbish bag to maintain in an opening status.

7. The automatic cat excrement removing device as claimed in claim 6, wherein the excrement collection compartment cover plate assembly comprises:
   a base detachably connected to the opening; and
   a cover plate, of which an end is hinged to the base, and configured to be in an open state under an action of self-gravity of the cover plate when the excrement collection compartment is at a lowest position of the ball compartment assembly, the cat excrement falling into the excrement collection compartment, wherein when the excrement collection compartment is at a highest position of the ball compartment assembly, the cover plate returns to a closed state under the action of self-gravity, and the cat excrement is locked in the excrement collection compartment.

8. The automatic cat excrement removing device as claimed in claim 7, wherein the excrement collection compartment cover plate assembly further comprises:
   a first magnet, disposed on a free end of the cover plate, wherein a second magnet is disposed at a position of the base which corresponds to the first magnet, so that the cover plate and the base are in a locking state during rotation of the ball compartment assembly from the initial position to the second position; when the ball compartment assembly returns to the initial position, the cover plate rests on the base again under the action of self-gravity and the first magnet and the second magnet are re-connected to reinforce a locking force between the cover plate and the base.

9. The automatic cat excrement removing device as claimed in claim 1, further comprising:

a sensing apparatus, configured to start, when a cat is sensed to leave the working compartment, a driving assembly to drive the ball compartment assembly to rotate from the initial position to the second position via the first position, until the cat excrement falls into the excrement collection compartment.

10. The automatic cat excrement removing device as claimed in claim 9, wherein the sensing apparatus is a microwave radar, or a pyroelectric infrared sensor, or a thermopile infrared sensor, or an infrared intrusion detector, or a light-sensing sensor.

11. The automatic cat excrement removing device as claimed in claim 1, further comprising:

a litter-cleaning module, configured to start, when a user starts the litter-cleaning module, a driving assembly to drive the ball compartment assembly to reversely rotate from the initial position to the first position via the second position, until cat litter completely falls into the excrement collection compartment.

12. The automatic cat excrement removing device as claimed in claim 11, wherein the litter-cleaning module is a button, or a touch key, or a module remotely controlled by means of Wi-Fi, smart phone apps, or a global wireless communication standard.

13. The automatic cat excrement removing device as claimed in claim 1, further comprising:

a driving assembly, wherein the driving assembly comprises:

a motor, fixedly disposed on the pedestal; and a gear assembly, of which one end is fixed disposed on an output end of the motor, and an other end is selectively connected to the ball compartment assembly, and configured to drive the ball compartment assembly to rotate under the driving of the motor.

14. The automatic cat excrement removing device as claimed in claim 13, wherein an end of the pedestal that is away from the gear assembly is further provided with rolling wheels, which are configured to support the ball compartment assembly when the ball compartment assembly is mounted on the pedestal; and when the ball compartment assembly rotates, the rolling wheels simultaneously rotate around their own axis.

15. The automatic cat excrement removing device as claimed in claim 13, wherein the gear assembly comprises:

a driving gear, a first driven gear and a second driven gear; wherein the first driven gear comprises a large gear and a small gear that are coaxially and integrally disposed; one end of the driving gear is connected to an output end of the motor, and an other end of the driving gear meshes with the large gear of the first driven gear; the small gear of the first driven gear selectively meshes with the second driven gear; the second driven gear is fixedly disposed on the ball compartment assembly.

16. An automatic cat excrement removing device, comprising:

a ball compartment assembly, configured to have at least three spaces comprising a working compartment used for holding cat litter and allowing a cat to excrete, a screening compartment for screening cat litter and cat excrement, and an excrement collection compartment for holding cat excrement, wherein the excrement collection compartment is provided with an opening that is configured to allow cat excrement to fall into the excrement collection compartment, wherein a surface of the screening compartment facing a center of a circle of the ball compartment assembly is provided with a plurality of screening holes;

a driving assembly, configured to drive the ball compartment assembly to automatically rotate; and an excrement collection compartment cover plate assembly that is disposed at the opening of the excrement collection compartment, wherein when the ball compartment assembly rotates to an initial position, the working compartment is located at a lowest position of the ball compartment assembly; when the ball compartment assembly rotates in a first direction to a first position from the initial position, the screening compartment is located at the lowest position of the ball compartment assembly, so that the cat litter falls into the screening compartment through the plurality of screening holes, while the cat excrement stays in the working compartment because a size of the cat excrement is larger than a size of each of the plurality of screening holes; and when the ball compartment assembly rotates in the first direction from the first position to a second position, the excrement collection compartment is located at the lowest position of the ball compartment assembly, so that the cat excrement falls near the opening of the excrement collection compartment; when the ball compartment assembly rotates continuously in a second direction from the second position to the first position, the cat excrement falls into the excrement collection compartment due to self-gravity of the cat excrement; when the ball compartment assembly rotates continuously back to the initial position from the first position, the cat litter falls into the working compartment through the screening holes of the screening compartment;

wherein a peripheral contour of the ball compartment assembly is a shape of a revolving body, the peripheral contour of the ball compartment assembly is formed by the working compartment, the screening compartment and the excrement collection compartment, the working compartment and the screening compartment are connected through the screening holes;

wherein the excrement collection compartment cover plate assembly further comprises:

a base; and a cover plate, of which an end is hinged to the base, and configured to be in an open state under an action of self-gravity of the cover plate when the excrement collection compartment is at a lowest position of the ball compartment assembly, the cat excrement falling into the excrement collection compartment, wherein when the excrement collection compartment is at a highest position of the ball compartment assembly, the cover plate returns to a closed state under the action of self-gravity, and the cat excrement is locked in the excrement collection compartment.

17. An automatic cat excrement removing device, comprising:

a ball compartment assembly, configured to have at least three spaces comprising a working compartment used for holding cat litter and allowing a cat to excrete, a screening compartment for screening cat litter and cat excrement, and an excrement collection compartment for holding cat excrement, wherein a surface of the screening compartment facing a center of a circle of the ball compartment assembly is provided with a plurality of screening holes, wherein a peripheral contour of the ball compartment assembly is a shape of a revolving body, the peripheral contour of the ball compartment assembly is formed by the working compartment, the screening compartment and the excrement collection compartment, the working compartment and the screening compartment are connected through the screening holes;

a driving assembly, configured to drive the ball compartment assembly to automatically rotate; and a litter-cleaning module, wherein when the ball compartment assembly rotates to an initial position, the working compartment is located at a lowest position of the ball compartment assembly; when the ball compartment assembly rotates in a first direction to a first position from the initial position, the screening compartment is located at the lowest position of the ball compartment assembly, so that the cat litter falls into the screening compartment through the plurality of screening holes, while the cat excrement stays in the working compartment because a size of the cat excrement is larger than a size of each of the plurality of screening holes;

when the ball compartment assembly rotates in the first direction from the first position to a second position, the excrement collection compartment is located at the lowest position of the ball compartment assembly, so that the cat excrement falls near the excrement collection compartment; when the ball compartment assembly rotates continuously in a second direction from the second position to the first position, the cat excrement falls into the excrement collection compartment due to self-gravity of the cat excrement; when the ball compartment assembly rotates continuously back to the initial position from the first position, the cat litter falls into the working compartment through the screening holes of the screening compartment; and when a user starts the litter-cleaning module, the ball compartment assembly rotates continuously in the second direction from the initial position to the first position via the second position until cat litter completely falls into the excrement collection compartment.

* * * * *